United States Patent [19]

Ideyama

[11] Patent Number: 6,002,404
[45] Date of Patent: Dec. 14, 1999

[54] IMAGE EDITING DEVICE FOR PROCESSING IMAGE DATA

[75] Inventor: Hiroyuki Ideyama, Toyokawa, Japan

[73] Assignee: Minolta Co., Ltd., Osaka, Japan

[21] Appl. No.: 08/889,818

[22] Filed: Jul. 8, 1997

[30] Foreign Application Priority Data

Jul. 9, 1996 [JP] Japan .................................. 8-179674
Jul. 9, 1996 [JP] Japan .................................. 8-179675

[51] Int. Cl.$^6$ .................................................. G06T 17/00
[52] U.S. Cl. ............................................................ 345/418
[58] Field of Search .................................. 345/418, 419, 345/420, 423, 424, 425

[56] References Cited

U.S. PATENT DOCUMENTS 5,142,355  8/1992  Fujima ......................................... 358/75

FOREIGN PATENT DOCUMENTS 63-223785  9/1988  Japan .
05094311  4/1993  Japan .

*Primary Examiner*—Phu K. Nguyen
*Assistant Examiner*—Cliff N. Vo
*Attorney, Agent, or Firm*—McDermott, Will & Emery

[57] ABSTRACT

An image editing apparatus reads a document image and obtains image data. Thus obtained image data is separately stored as data to be displayed on a display and data for recognizing a closed region in the image. In order to more readily recognize such a closed region, only the latter data is processed without changing the data to be displayed on the display. Thus, an image much easier to view can be displayed on the display.

20 Claims, 30 Drawing Sheets

| MEMORY | MEMORY PLANE | BLACK-AND-WHITE DOCUMENT | COLOR DOCUMENT | BLACK-AND-WHITE + COLOR DOCUMENT |
|---|---|---|---|---|
| EDITING AREA DESIGNATION MEMORY | BIT 15 | 1ST-15TH CHARACTERS/ BASE PROCESSING AREA CODES<br><br>* 1ST-15TH CHARACTERS/BASE PROCESSING AREAS ARE ALLOCATED TO BITS 15-1 | 1ST-6TH CHARACTERS/ BASE PROCESSING AREA CODES<br><br>* 1ST-6TH CHARACTERS/BASE PROCESSING AREAS ARE ALLOCATED TO BITS 15-10 | 1ST-14TH FOR FIT IN COMBINATION<br>· CHARACTER COMBINED-BLACK-AND-WHITE DOCUMENT WINDOW FOR EDITING DESIGNATED AREA CODE<br><br>* 1ST-14TH FIT IN COMBINED/CHARACTER COMBINED-BLACK-AND-WHITE DOCUMENT EDITING-WINDOW DESIGNATION AREA IS ALLOCATED TO BITS 15-2 |
| | BIT 14 | | | |
| | BIT 13 | | | |
| | BIT 12 | | | |
| | BIT 11 | | | |
| | BIT 10 | | | |
| | BIT 9 | | 1ST-4TH COLOR CHANGE AREA CODES<br><br>* 1ST-4TH COLOR CHANGE AREAS ARE ALLOCATED TO BITS 9-6 | |
| | BIT 8 | | | |
| | BIT 7 | | | |
| | BIT 6 | | | |
| | BIT 5 | | 1ST-3RD MONOCHROME AREA CODES<br><br>* 1ST-3RD MONOCHROME AREAS ARE ALLOCATED TO BITS 5-3 | |
| | BIT 4 | | | |
| | BIT 3 | | | |
| | BIT 2 | | PATTERNING AREA CODE | |
| | BIT 1 | | NEGATIVE/POSITIVE REVERSING AREA CODE | ← |
| | BIT 0 | ERASE AREA CODE | | IMAGE COMBINING DESIGNATION AREAS<br>0: OVERLAP COMBINATION<br>1: FIT IN/CHARACTER COMBINATION<br>2: IMAGE ERASING<br>3: NON-SELECTED (SCANNER IMAGE) |

FIG. 9A
FIG. 9B
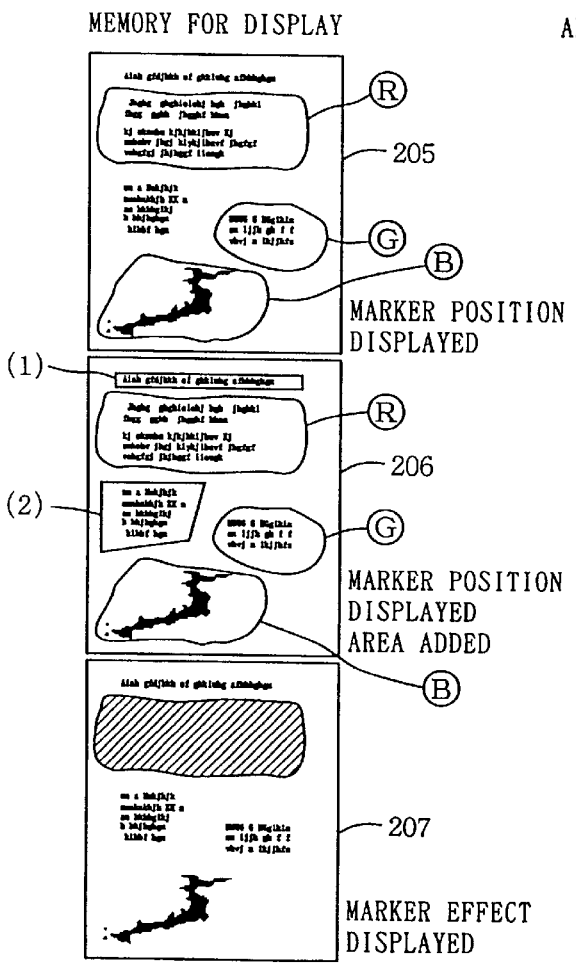
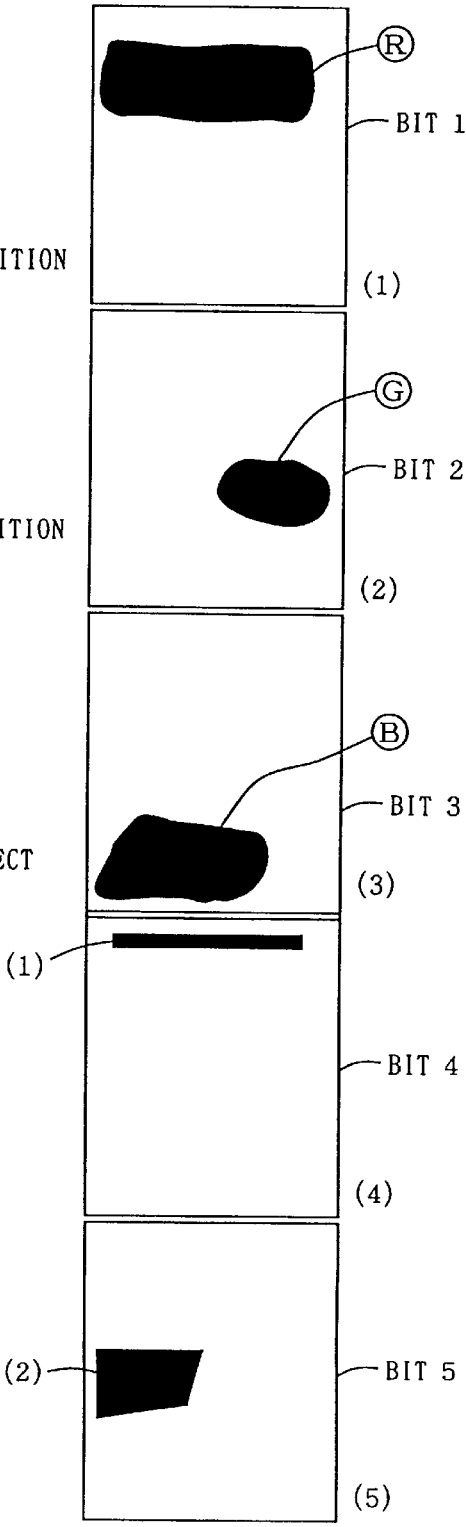

| MEMORY | MEMORY PLANE | BLACK-AND-WHITE DOCUMENT | COLOR DOCUMENT | BLACK-AND-WHITE + COLOR DOCUMENT |
|---|---|---|---|---|
| CLOSED LOOP. MARKER DETECTION/ LCD DISPLAY DOCUMENT MEMORY | BIT 7 | BLACK-AND-WHITE GRADATION DATA FOR DISPLAY | LCD DISPLAY CODES | LCD DISPLAY CODES |
| | BIT 6 | | | |
| | BIT 5 | | | |
| | BIT 4 | | | |
| | BIT 3 | MARKER COLOR CODES 0:NON 1:R 2:G 3:B 4:C 5:M 6:Y | | |
| | BIT 2 | | | |
| | BIT 1 | | | |
| | BIT 0 | BLACK-AND-WHITE BINARIZED DATA | | |

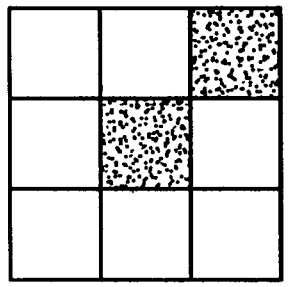
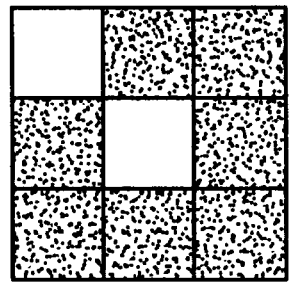
IF AT LEAST ONE BLACK PIXEL EXISTS IN 8 PIXELS SURROUNDING A PIXEL OF INTEREST, THE PIXEL OF INTEREST IS SET AS BLACK
IF AT LEAST ONE WHITE PIXEL EXISTS IN 8 PIXELS SURROUNDING A PIXEL OF INTEREST, THE PIXEL OF INTEREST IS SET AS WHITE
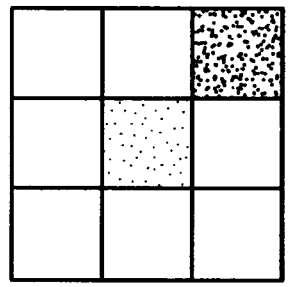
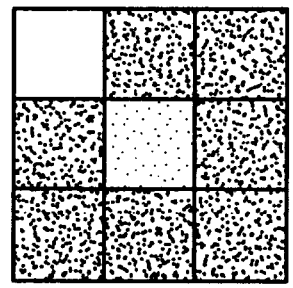
THICKENING PROCESSING
NARROWING PROCESSING
FIG. 15

ROUND RECTANGLE

IMAGE EDITING DEVICE FOR PROCESSING IMAGE DATA

BACKGROUND OF THE INVENTION

1. Field of the Invention

The present invention relates generally to image editing devices, and more particularly, to an image editing device capable of displaying a read document for a user to edit the displayed content.

2. Description of the Related Art

U.S. Pat. No. 5,142,355 and Japanese Patent Laid-Open No. 63-223785 disclose methods of writing, in a memory, data to recognize closed regions read from a document, recognizing the closed regions by referring to the data and editing the regions.

According to these conventional methods, however, the result of editing the regions, in other words if the closed regions have been surely recognized is not available until a copy is output, and therefore copying errors frequently result.

Japanese Patent Laid-Open No. 5-94311 discloses an editing device incorporating image data into a memory, displaying the data in the memory onto a display, and editing the data on the display.

The conventional editing device is however encountered with a disadvantage that read images are stored in the memory by a single method, and therefore it is very difficult to recognize regions or particular colors from the stored images for image processing.

SUMMARY OF THE INVENTION

It is an object of the invention to provide an image editing device capable of displaying a read document in a manner easy for a user to recognize.

Another object of the invention is to provide an image editing device permitting a user to access the result of editing images before a copy is output.

Yet another object of the invention is to provide an image editing device permitting a read image to be readily processed.

In order to achieve the above-described objects, an image editing device according to one aspect of the invention includes a unit for reading a document image and obtaining image data, a first storage unit for storing the obtained image data as image data to be displayed on a display, a processing unit for processing the obtained image data into data used for recognizing closed regions provided in the document image, and a second storage unit for storing the processed data.

More preferably, the image editing device further includes a unit for editing the document image based on the processed data, and a unit for displaying a result of editing based on the result of editing by the editing unit and the image data stored in the first storage unit.

According to the invention, a read document can be displayed on a display in a manner easy for a user to recognize by the function of the first and second storage units. Furthermore, the display of the editing result permits a user to know the result before a copy is output.

According to another aspect of the invention, the image editing device includes a unit for setting at least one of a plurality of modes, a unit for reading a document image and obtaining image data, a unit for storing the obtained image data according to a method based on the set mode, and a unit for editing the document image based on the stored image.

According to the invention, the obtained image data is stored based on the set mode, and therefore an image editing device making easier succeeding image processing can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a table for use in illustration of how to use memory planes in the editing area designation memory;

FIGS. 9A and 9B show the relation between data stored in the area designation memory and an image displayed on an LCD;

FIG. 12 is a table showing how memory planes correspond to a document input to memory 620;

FIG. 15 is a diagram for use in illustration of a closing processing;

DESCRIPTION OF THE PREFERRED EMBODIMENTS

Figure 1:
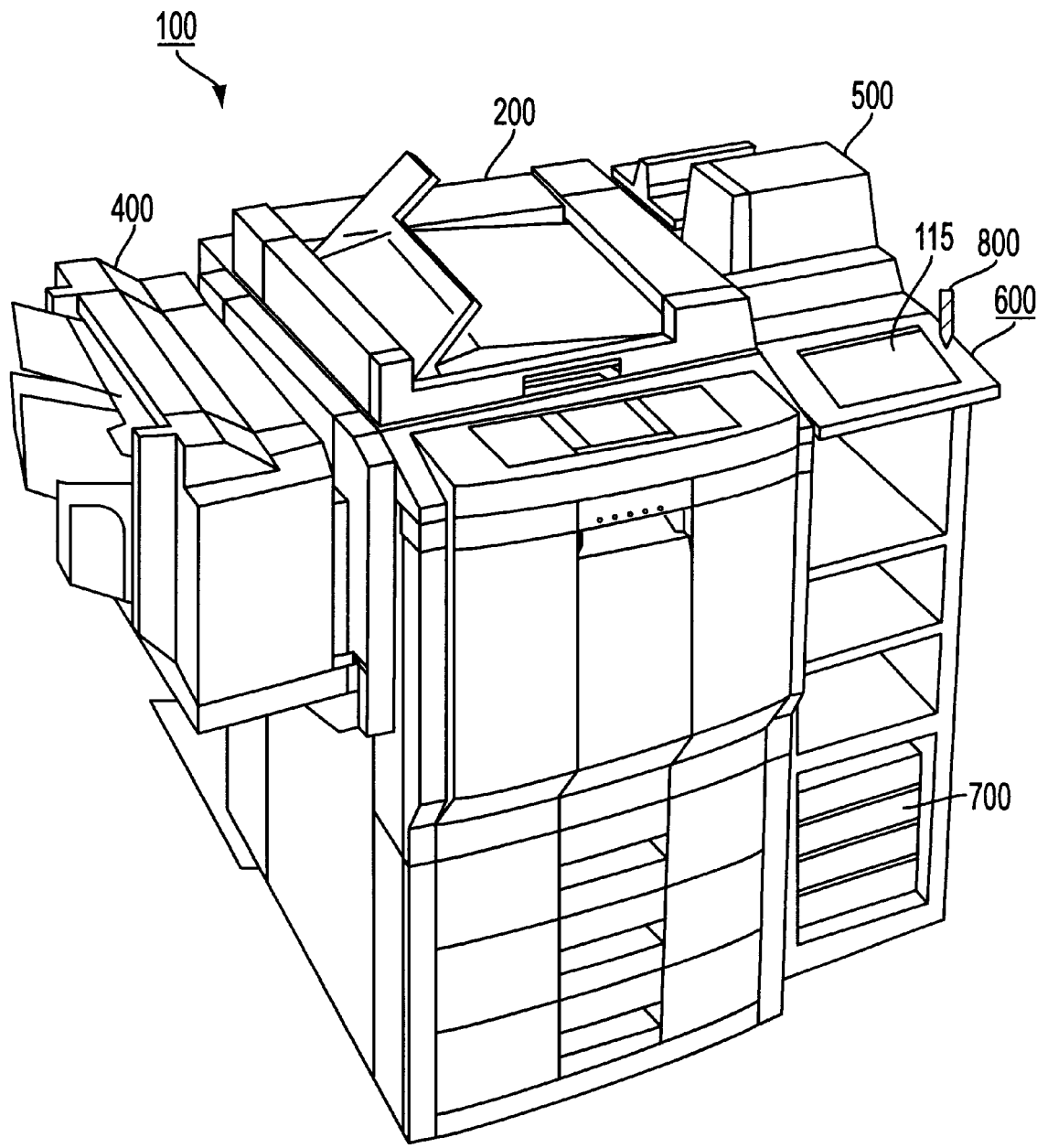
FIG. 1 is a perspective view showing a copying machine according to one embodiment of the invention.

Now, preferred embodiments of the invention will be described in conjunction with the accompanying drawings, in which like reference characters represent the same or corresponding portion.

FIG. 1 is a perspective view showing a digital color copying machine according to one embodiment of the invention.

Referring to FIG. 1, color copying machine 100 includes an automatic document feeder (ADF) for a large volume of documents, a sorter 400 for sorting copy sheets, a film projector 500 for making copies from a film document, a screen editor 600, characteristic to the color copying machine according to this embodiment, and a printer controller 700 connected to a personal computer or an EWS (work station) to use the copying machine as a color printer.

Screen editor 600 includes a color liquid crystal display (LCD) 115 which displays a read document and various operation menus for giving directions to the user in operation.

There is provided, on color LCD 115, a transparent tablet (touch panel) to detect coordinates indicated by the user, and the user can directly input coordinates on the color LCD to the machine using a pen 800.

Figure 2:
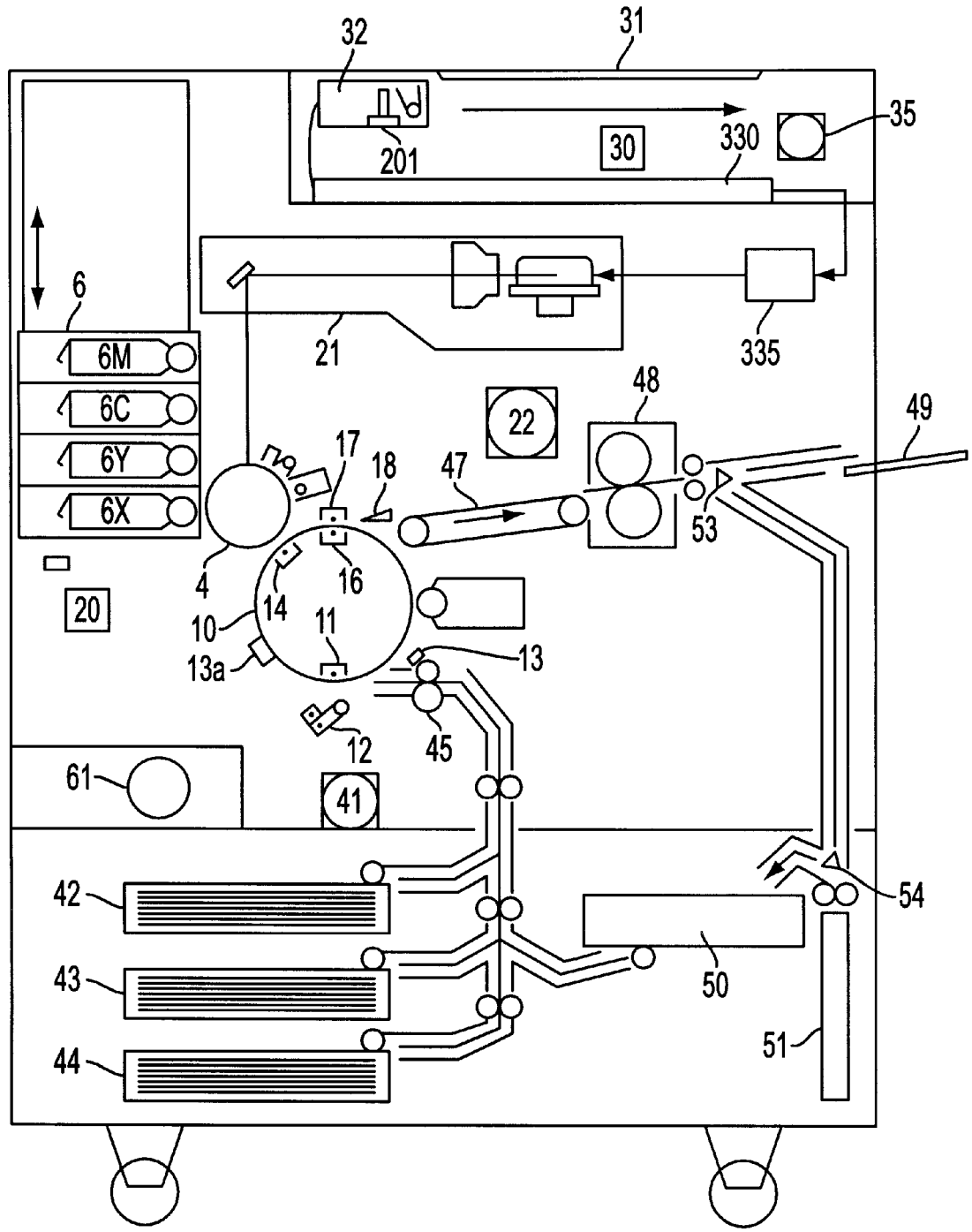
FIG. 2 is a cross sectional view showing the copying machine shown in FIG. 1.

FIG. 2 is a cross sectional view for use in illustration of the mechanism of the color copying machine shown in FIG. 1.

Referring to FIG. 2, the copying machine is roughly divided into an image reader portion 30 and a printer portion 20, each of which will be detailed below.

(1) Image Reader Portion 30

Image reader (IR) portion 30 includes a platen 31 to place a document, a scanner 32 to scan a document by exposure, an image sensor (CCD) 201 to sense light reflected from a document, an image signal processing portion 330 to process a signal from the image sensor, a print head (PH) control portion 335 to output a control signal to the printer portion based on a signal from the image signal processing portion, and a pulse motor 35 to drive scanner 32.

The image of a document placed on platen 31 is exposed to light and scanned, and light reflected from the image is photoelectrically converted by image sensor 201. The signal resulting from the photoelectric conversion is subjected to a prescribed processing in image signal processing portion 330, and digital image data for driving a laser diode is produced. Thus produced digital image data is transmitted to print head control portion 335.

(2) Printer Portion 20

Printer portion 20 is roughly divided into an image forming portion and a developing unit portion, and a sheet processing portion, each of which will be separately described.

(a) Image Forming Portion

The image forming portion includes a laser device 21 driven based on the digital image data transmitted from image reader portion 30, a photoreceptor drum 4 to write an electrostatic latent image, a developing unit 6 for development with toner, a transfer drum 10 to transfer an image onto a surface of a sheet, and a drum drive motor 22 to drive the photoreceptor drum and transfer drum.

Laser device 21 is driven based on input digital image data. By driving laser device 21, an electrostatic latent image forms on the surface of photoreceptor drum 4. The electrostatic latent image is developed with toner by developing unit 6, and transferred onto a surface of a printing sheet placed on transfer drum 10.

Note that photoreceptor drum 4 and transfer drum 10 are driven in synchronization with each other by drum drive motor 22.

(b) Developing Unit 6

Developing unit 6 includes a magenta developer 6M for development with magenta toner, a cyan developer 6C for development with cyan toner, a yellow developer 6Y for development with yellow toner, a black developer 6K for development with black toner, four toner hoppers for supplying toner of a color corresponding to each developer, and a developing unit motor 61 for moving developing unit 6 in upward and downward directions.

(c) Sheet Processing Portion

The sheet processing portion includes storage cassettes 42–44 for storing sheets for printing, and an intermediate storage portion 50 for temporarily storing a sheet.

A sheet taken out from any of storage cassettes 42–44 or a sheet supplied from intermediate storage portion 50 is sent to transfer drum 10 by a group of transport rollers and wound around transfer drum 10. Then, toner images on photoreceptor drum 4 (in four colors at most) are sequentially transferred onto the sheet.

The sheet with the transferred image is separated from transfer drum 10, followed by fixing at a fixing device 48 and discharged onto a discharge tray 49.

The machine is provided with a pair of timing rollers 45 for providing timing for registration at the time of transporting the sheet and a transfer belt 47.

Note that the group of transport rollers and transfer belt 47 are driven by main motor 41.

Transfer drum 10 is provided with a tip chuck claw for chucking the tip of a sheet, an attraction charger 11 electrostatically attracting the sheet to transfer drum 10, a roller 12, a press-roller 12 for press-holding the sheet, a transfer charger 14 for sucking a toner image appearing on the photoreceptor drum onto the sheet for transfer, dischargers 16, 17 for electrically discharging the transfer drum to separate the sheet therefrom after the toner image has been transferred (the toner images for four colors have been transferred in the case of full color development), and a separation claw 18 for removing the sheet from the transfer drum.

The sheet after the above printing steps is brought into intermediate storage portion 50.

Whether to transport the sheet after the printing steps to discharge tray 49 or to intermediate storage portion 50 is determined based on the switching of a transport path switch portion 53 provided in the path transporting the sheet after the fixing processing.

Another transport path switching portion 54 is provided in the transport path toward intermediate storage portion 50. Transport path switching portion 54 selects whether to store the sheet into intermediate storage portion 50 after transporting the sheet in a switched back manner by a reversing device 51, or directly into intermediate storage portion 50.

Such selection is made for the purpose of determining whether to transfer an image on the side of the sheet which has been already printed (such transfer mode is called "image overlapped mode") or to transfer the image on the back side (which is called "duplex copy mode"), when the sheet supplied from intermediate storage portion 50 is once again transferred to the transfer drum.

The transfer drum is further provided with a reference position sensor 13 for detecting the reference position of the transfer drum, and an actuator plate 13a for operating the reference position sensor.

The operations of their image reader portions and printer portions will be described later.

Figure 3:
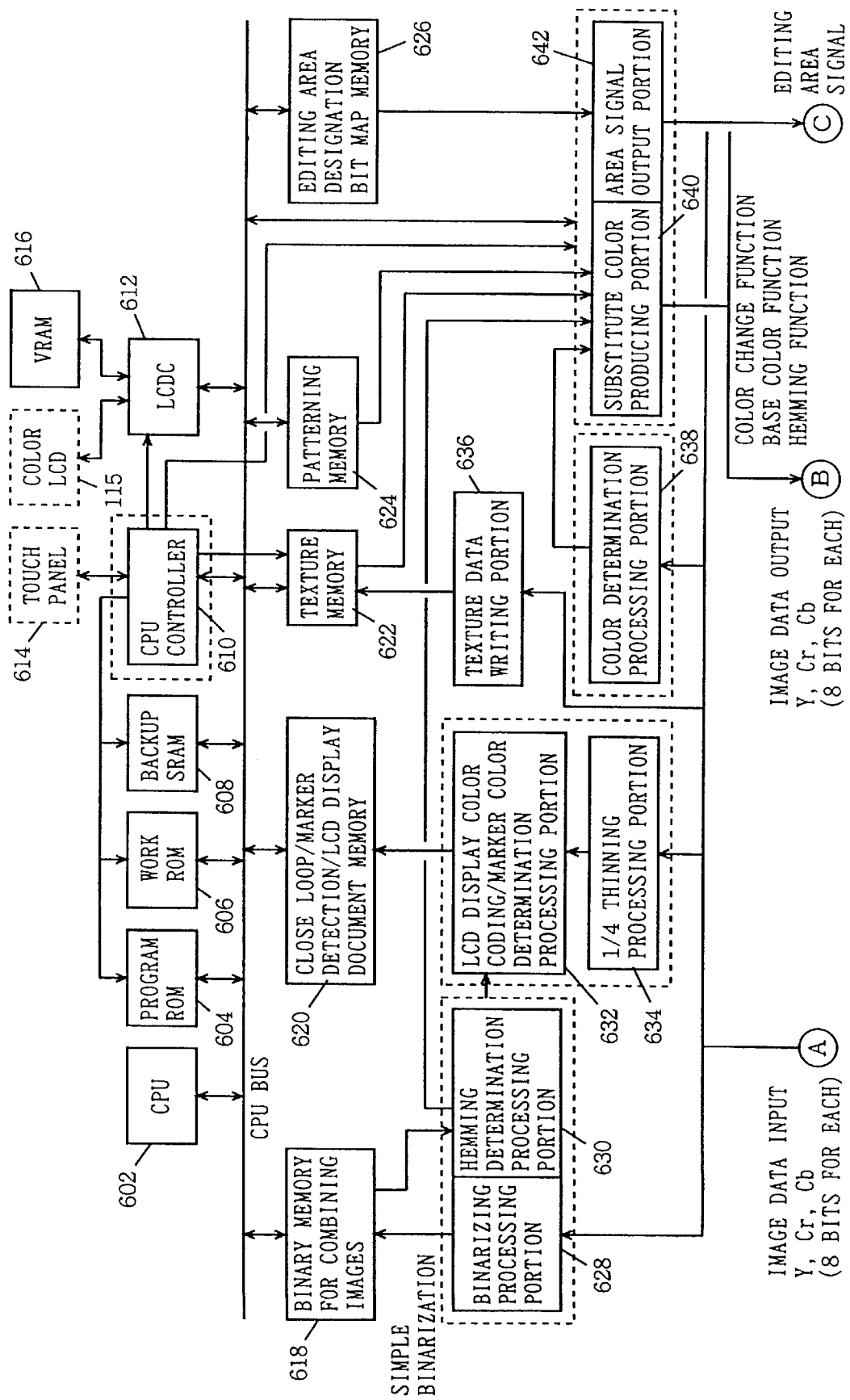
FIG. 3 is a block diagram showing a screen editor included in the copying machine shown in FIG. 1.
Figure 4:
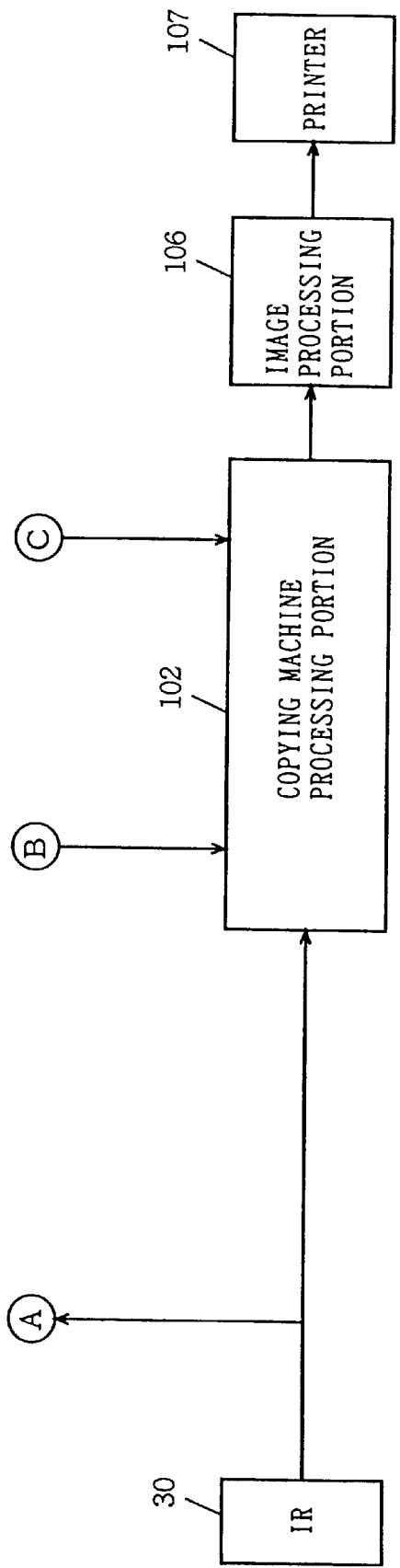
FIG. 4 is a block diagram showing a main portion of the copying machine shown in FIG. 1.

FIG. 3 is a block diagram showing an electronic circuit for image processing included in the screen editor in the copying machine shown in FIG. 1, and FIG. 4 is a block diagram showing an image processing circuit included in the main body of the copying machine. FIGS. 3 and 4 are connected at positions A, B and C.

Referring to FIG. 3, the screen editor includes the following elements.

(a) Binary Memory for Combining Images (618)

The memory 618 stores a binary signal of a signal representing the luminance of document information (Y). The image of a black-and-white document is stored in the memory, and used as character information when combined with a color document (character combining function).

(b) LCD Display Document/Closed Loop.Marker Detection Memory (620)

In the color document editing mode, the memory converts document information into data to be input to the color pallet of the LCDC (LCD Controller) for display on the LCD and stores the data thinned to 100 dpi. More specifically, the number of colors in a document image is reduced to the number which can be displayed on the LCD and stored.

In the black-and-white document editing mode, the memory thins binary signals of 1 bit black-and-white (closed loop detection) information, 3 bit color information (R, G, B, C, N, Y) and 4 bit black-and-white gradation (for display) in a document to 100 dpi for storing.

Document information within the memory is transferred to a VRAM by the CPU for display.

In the black-and-white editing mode, the CPU detects a closed loop, a marker point position, and a marker closed loop in the document based on the information within the memory and produces editing area designation information.

As described above, the memory advantageously changes the method of storing based on the mode selected.

(c) Editing Area Designation Memory (626)

In the memory, 16 kinds of editing area signals are set as bit map information by the CPU based on coordinate designation from closed loop.marker detection memory 620 and the touch panel 614 of the editor. The output of area signals is controlled separately among editing functions based on the editing area information within the memory.

(d) Texture Memory (622)

The memory stores various patterns read from documents for later use in the background or the like of a document, and data for processing background gradation. The background gradation processing data is set by the CPU. Based on image data stored in the memory, a color document is provided with patterns and the background gradation processing for a black-and-white document is performed. The memory has a maximum scanning cycle (horizontal scanning) of 128 dots, a vertical scanning cycle of 256 dots, and a gradation (luminance) of 256 levels.

(e) Patterning Memory (624)

The memory stores binary data in the form of patterns for patterning processing. The pattern form binary data stored in the memory are used for patterning a black-and-white document. The pattern form binary data in the memory is set by the CPU. The memory has a pattern size of 128 dots (horizontal scanning) and 256 dots (vertical scanning) and there are eight kinds of patterns.

(f) Binarizing Portion (628)

The binarizing portion writes a simple binary output of a write signal (Y) from document input data to binary memory 618 during prescanning. During image reproducing scanning, the simple binary output of write signal (Y) from the document input data is output to a substitute color data producing portion 640 as character region determination data.

During the image reproducing scanning, the binary outputs of luminance signal (Y) and color saturation signal (G) of the document input data are output to substitute color data producing portion 640 as base region determination data.

(g) Hemming Determination Portion (630)

The hemming/cut out of image data in the area designated by the editing area signal is determined, and the determination information is output to substitute color data producing portion 640. During the hemming determination, prescribed determinations are made for the following functions.

Hemming function: the hemming edge of a binarized input image is detected, and the edge determination information is output to the substitute color data producing portion.

Cut out function: the inner edge of the binarized input image is detected, and the edge determination information is output to the substitute color data producing portion.

(h) Marker Color Determination.LCD Display Image Data Coding Processing Portion (632)

In the black-and-white document editing mode, during prescanning, document input data is divided into seven kinds, i.e., black-and-white and colors (R, G, B, C, Y and M) and output to LCD display document/closed loop.marker detection memory 620.

In the color document editing mode, during prescanning, document input data is converted to color codes for LCD display, and output to the LCD display document/closed loop.marker detection memory 620.

Data is written into LCD display document/closed loop.marker detection memory 620 for each 4 lines in the vertical scanning valid period.

Marker color determination.LCD display is retrieved from an ROM using Y, Cr, Cb as address information. An ROM table (256K×8 bits) is installed for coding image data for marker color determination.LCD display.

(i) 1/4 Thinning Processing Portion (634)

During prescanning, document input data is subjected to simple thinning for each 4 dots in the horizontal scanning direction, and the resulting data is output to marker color determination. LCD display image data coding processing portion 632.

(j) Texture Data Writing Portion (636)

During prescanning, the luminance signal (Y) of part of document input data (128×256 dots) is written into the texture memory.

(k) Color Determining Portion (638)

The color determining portion determines the colors of image data in the area designated by the editing area signal and outputs the determination information to substitute color data producing portion 640. The portion makes a prescribed determination for each function as color determination as follows.

Color change function: to determine whether an input image is of a designated document color and outputs the determination information to the substitute color data producing portion.

Texture function: to determine whether an input image is of a designated document color and the determination information is output to the substitute color data producing portion (designated color texture function).

Color determination portion 638 is provided with an ROM table for transforming color determination polar coordinates.

(1) Substitute Color Data Producing Portion (640)

The portion changes the colors of image data in an area designated by an editing area signal and outputs image data partly substituted by hemming editing instruction information. The substitute color data processing includes a prescribed conversion for each function as follows.

Color change function: a designated document color is changed to a designated substitute color (color region).

Texture function: a designated document color is changed into a texture memory data (color region).

Background color substitution function: a white region is changed into a region of a designated substitute color and a pattern (monochrome region).

Hemming function: the colors of an edge portion and an image inside the edge are changed into separate designated substitute colors (monochrome region).

(m) Area Signal Output Portion (642)

The area signal output portion changes an area signal designated by editing area memory 626 into an editing attribute signal to be output to the copying machine main body, and outputs an editing instruction signal to the hemming determination processing portion, color determination processing portion and substitute data producing portion. The attribute signal output to the copying machine main body is a monocolor/monochrome indication signal, negative/positive determination indication signal, or an image substitute/image erase/character combining indication signal.

(n) VRAM (616)

The VRAM is an image memory to store image data displayed on an LCD. Image data is written into the memory by the CPU. The image data within the memory is displayed on the LCD by the LCDC.

(o) LCDC (612)

The LCDC controls the LCD (VGA: 640×480/256 colors) and VRAM, and reads image data set in the VRAM for display on the LCD.

(p) CPU (602)

The CPU controls the display of LCD and produces editing area information.

(q) CPU Controller (610)

The CPU controller controls the address decoding and a bus when externally accessed. The controller controls input/output to/from the CPU through touch panel I/F.

(r) Program ROM (604)

The ROM stores programs for the CPU.

(s) Work RAM (606)

The RAM is for work/stack for the CPU.

(t) Backup SRAM (608)

The SRAM includes a built in battery to store backup parameters. The parameters are written by the CPU.

(u) Color LCD (115)

(v) Touch Panel (614)

Referring to FIG. 4, the copying machine main body includes an image reader 30, a copying machine processing portion 102 for converting a signal output from the image reader, an image processing portion 106 for processing a signal output from the copying machine processing portion 102, and a printer for printing an image corresponding to an output signal from the image processing portion.

Image reader 30 outputs 8 bit image data for each of Y, Cr and Cb. The output image data is input to the screen editor and copying machine processing portion 102. Copying machine processing portion 102 are provided with image data from image reader 30, 8 bit image data for each of Y, Cr and Cb output from the screen editor, and an editing area signal, and outputs processed image data.

Figure 5:
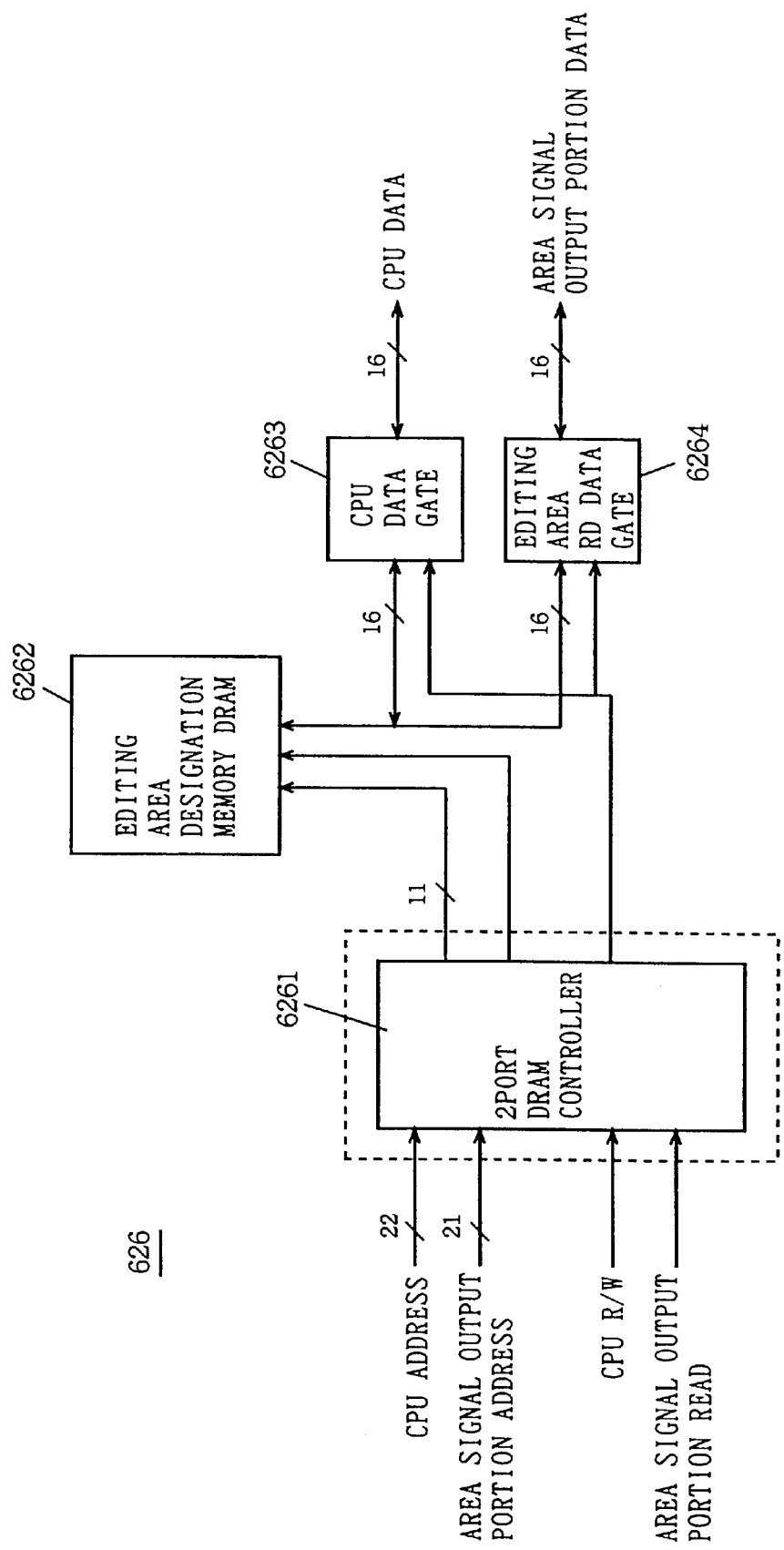
FIG. 5 is a block diagram showing the configuration of an editing area designation memory 626.

FIG. 5 is a block diagram showing in detail the configuration of editing area designation memory 626.

The memory thins binary signals of 1 bit for black-and-white and 3 bits for colors (R, G, B, C, M, Y) to 100 dots for storing. The memory also functions as a closed loop-marker detection memory. The memory also stores an editing area based on designated coordinates input through the touch panel. The memory stores 16 kinds of editing area signals as bit map information.

Editing area designation memory 626 includes a DRAM 6262, a controller 6261 for the DRAM, a CPU data gate 6263, and the data gate 6264 of the editing area signal output portion. DRAM controller 6261 is provided with a CPU address, an area signal output portion address, a CPU read/write signal, and data from the area signal output portion. CPU data gate 6263 exchanges data with the CPU. Editing area output portion data gate 6264 outputs data to area signal output portion 642.

Figure 6:
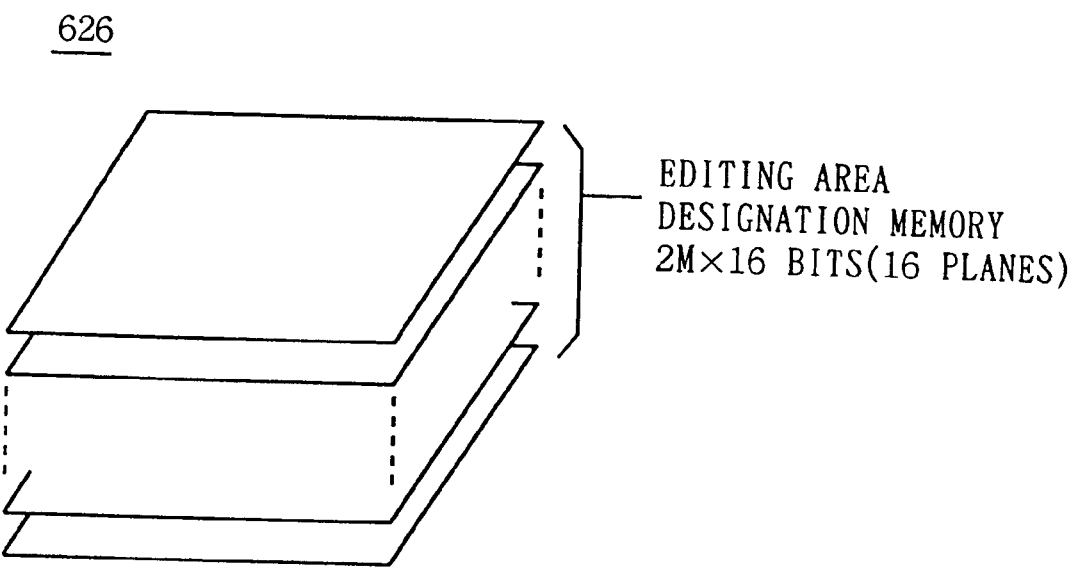
FIG. 6 is a view for use in illustration of the structure of editing area designation memory.

FIG. 6 is a diagram showing the planes of editing area designation memory. Referring to FIG. 6, the editing area designation memory is formed of 16 planes. One plane has a capacity of 2 Mbytes, and used to specify the position to edit in an input image data. The role of each plane in the editing area designation memory changes for each editing mode or each editing function.

FIG. 7 is a diagram showing how the memory planes of the editing area designation memory are allocated in each mode.

Referring to FIG. 7, the role of memory plane in each of bits 0 to 15 is described separately for the case of a black-and-white document, a color document, and black-and-white+color document.

Herein, the black-and-white document includes a document without coloring, and a black-and-white document having an area designated with a color marker by the user for the purpose of editing. The color document is a document such as a photograph. Black-and-white+color document is a document including both a black-and-white portion and a color portion.

Referring to FIG. 7, for a black-and-white document read, bit 0 is used as an erase area code. Herein, an image in a region designated by the erase area code is to be erased.

Bits 1 to 15 are used as the 1st to 15th character/base processing area codes. Thus, an editing processing corresponding to a region designated by each bit is executed.

If a color image document is input, bit 0 is used as an erase area code. Bit 1 is used as a negative/positive reversing area code. Bit 2 is used as a code for an area to be provided with patterns.

Bits 3 to 5 are used as first to third monochrome area codes to allocate first to third monochrome areas.

Bits 6 to 9 are used as first to fourth color change area codes to allocate first to fourth color change areas.

Bits 10 to 15 are used as first to sixth character/base processing area codes to allocate first to sixth character/base processing areas.

For a black-and-white+color document read, bits 0 and 1 are used as an image combining indication area. If the number indicated by bits 0 and 1 is "0", overlap combining is performed, for "1", fit in/character combining is performed, for "2", the image is erased, and for "3", no image is combined.

Bits 2 to 15 are used as area codes to allocate first to fourteenth fit in combining/character combining, editing within a black-and-white document and window designation areas.

Thus, the editing area designation memory is used in different ways based on the input image data.

Now, data stored in the editing area designation memory will be described by way of example.

Figure 8A:
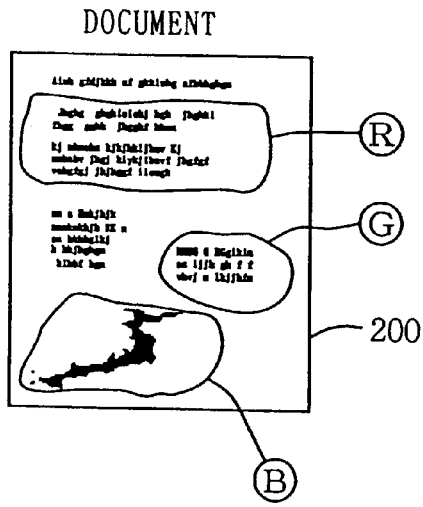
FIGS. 8A and 8B show the relation between a read document and data stored in the memory.
Figure 8B:
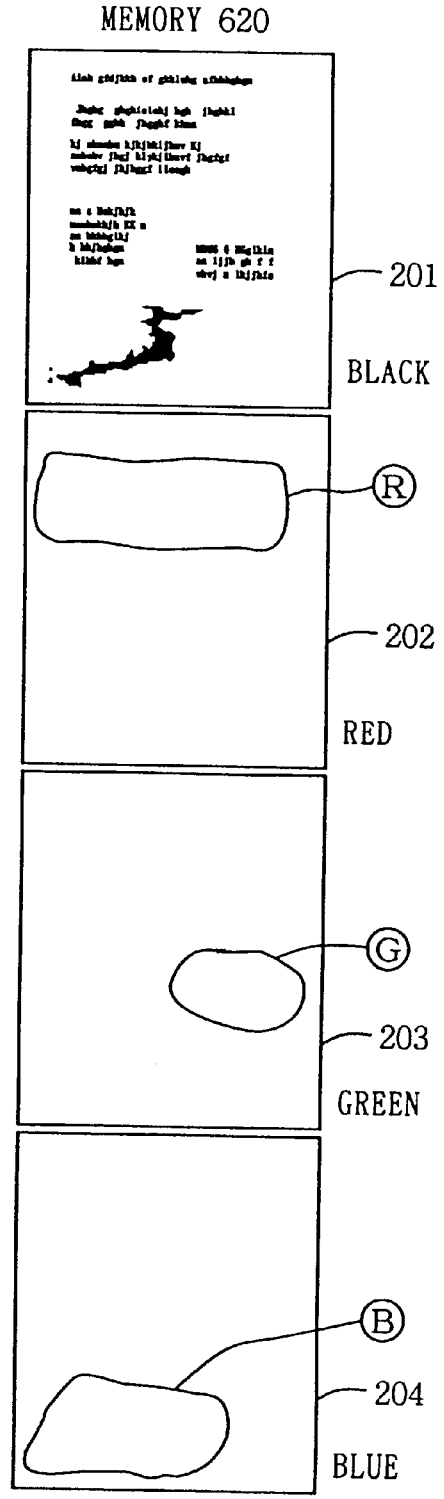

Referring to FIG. 8A, the processing will be detailed when there are regions surrounded by a red marker (R), a green marker (G), and a blue marker (B) in part of a black-and-white document read by the image reader.

The document is read by image reader 30, binarized at binarizing processing portion 628 and stored in closed loop/marker detection/LCD display document memory 620.

At the time, in memory 620, as shown in FIG. 6B, data for only the black-and-white portion of the document is stored in a plane 201 to store black data.

Meanwhile, in a plane to store the marker color code of each of green and blue, as indicated by codes 202 to 204, only images in the portion corresponding to each marker color in the document are stored.

The document image stored in memory 620 is transferred to VRAM 616 through CPU 602, and then output to color LCD 115.

At the time, manually or by automatic setting with a device, whether to directly display the read document or to display an image after the image processing by the markers is selected.

More specifically, referring to FIG. 9A, if the mode to directly display the figures delineated by the markers is selected, the image the same as the read document image is stored in the VRAM as shown in image 205, and displayed on color LCD 115.

Meanwhile, the mode to display the effect of image processing by markers (the mode to display an image after image processing) is selected, based on the color of the marker as indicated by image 207 and its position, an image after image processing will be displayed. Note that the region surrounded by the red marker is hatched, the region surrounded by the green marker is colored, and a figure in the region surrounded by the blue marker has been reduced.

As image 205 is displayed, the user can mark with markers to the image being displayed through touch panel 614. For example, the user can additionally mark regions (1) and (2) to image 205 as in image 206 through touch panel 614.

More specifically, the user can know the states before and after image processing, make marking with markers for image processing through touch panel 614, which makes the machine easier to handle.

In editing area designation memory 626, data used for editing a black-and-white document is stored in each bit. More specifically, figures indicating editing regions set by marking with markers or input through the touch panel by the user are stored in the regions of bits 1 to 15.

Now, let us assume that an editing area as indicated by code 206 in FIG. 9A is set. Referring to FIG. 9B, the region surrounded by red marker (R) drawn in a black-and-white document is stored in bit 1 in area designation memory 626 in the state in which the inside the region is painted out. Note that the painted out position is stored with data of "1", and otherwise data of "0" is stored.

Similarly, the regions surrounded by green (G) and blue (B) being painted out are stored in bits 2 and 3, respectively in area designation memory 626.

The region of portion (1) input through the touch panel is stored in bit 4 in the area designation memory as being painted out, and the region (2) input through the touch panel is stored in bit 5 as being painted out.

Area signal output portion 642 recognizes the painted out regions stored in the memory, identifies these painted out regions to be regions for image processing, and outputs an editing area signal to copying machine processing portion 102.

Figure 10:
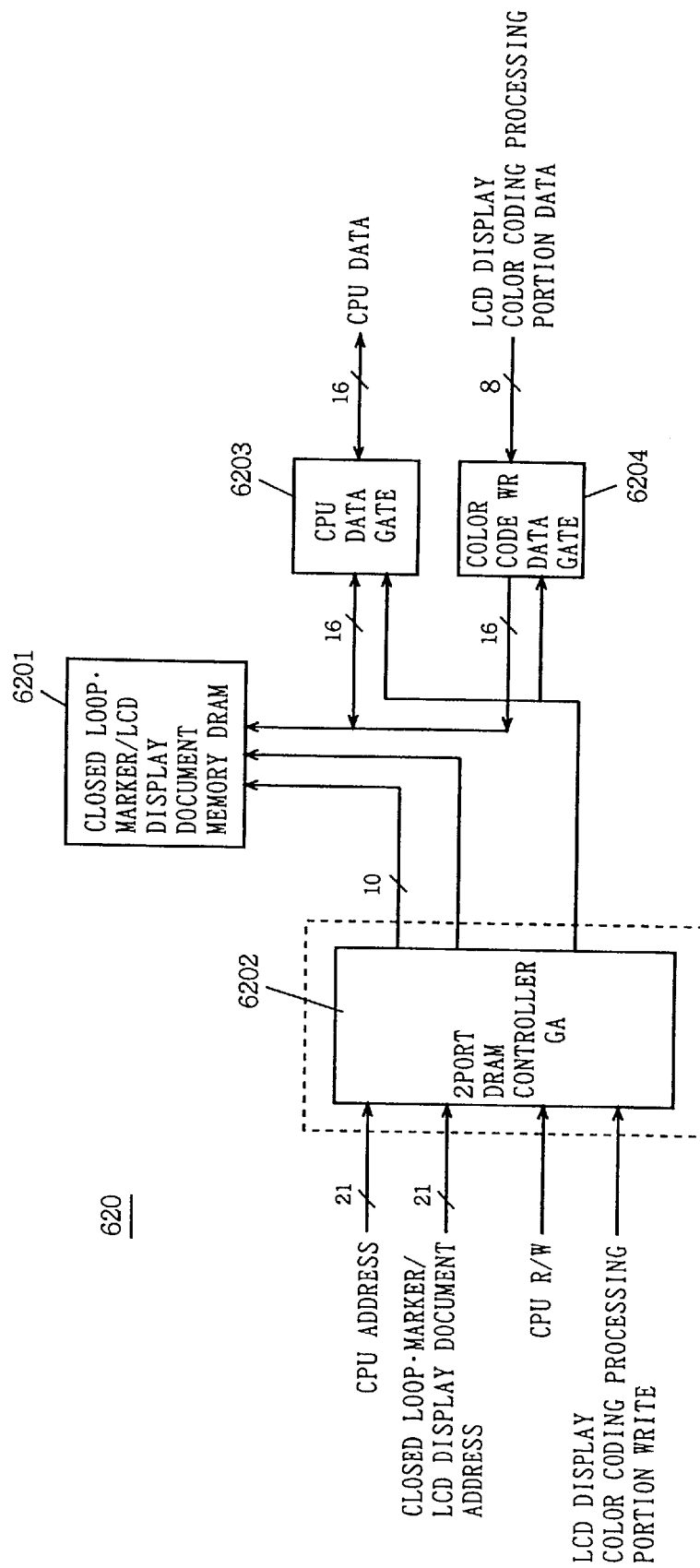
FIG. 10 is a block diagram showing the configuration of a closed loop/marker detection/LCD display document memory 620.

FIG. 10 is a block diagram specifically showing the configuration of closed loop.marker detection memory/LCD display document memory 620.

Referring to FIG. 10, the memory stores color coding data for closed loop.marker determination data/LCD display which is produced by thinning document information to 100 dpi. The document information in the memory is transferred to the VRAM by the CPU and displayed on the LCD. In the black-and-white document mode, the closed loop.marker is detected by the CPU. The memory can be accessed by the CPU, the marker determination processing portion, and the LCD display color coding processing portion.

Referring to FIG. 10, memory 620 includes a DRAM 6201, a controller 6202 for the DRAM, a CPU data gate 6203, and a color code write/read data gate 6204.

DRAM controller 6202 is provided with a closed loop.marker/LCD display document address, a CPU write/read signal, and a write signal for the LCD display color coding processing portion.

CPU data gate 6203 exchanges data with the CPU. Color code WR data gate 6204 is provided with data from the LCD display color coding processing portion.

Figure 11:
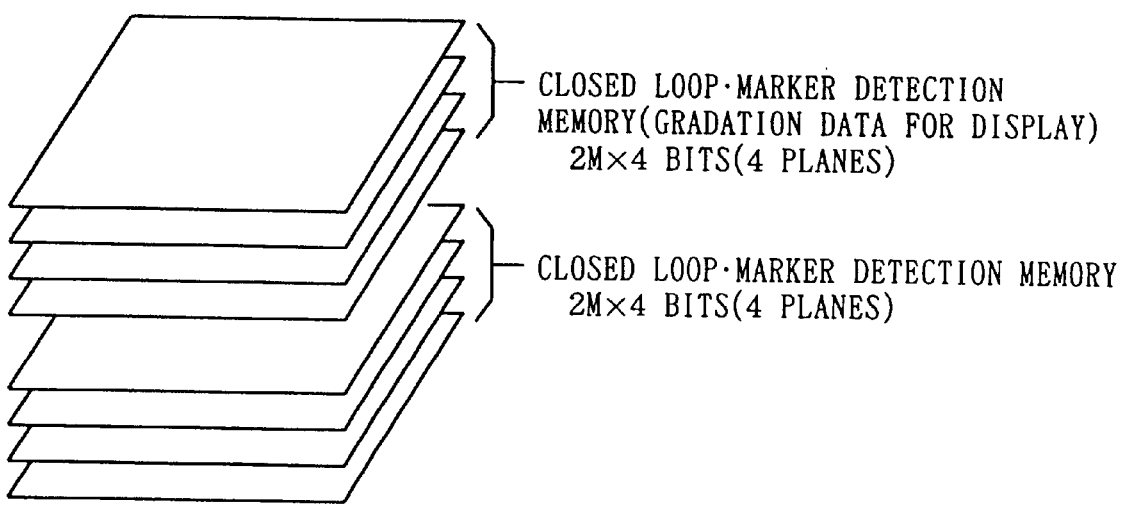
FIG. 11 is a view for use in illustration of the structure of memory 620 in a black-and-white document mode.

FIG. 11 is a diagram for use in illustration of the arrangement of planes in the closed loop.marker detection/LCD display document memory.

Referring to FIG. 11, there are eight layers of planes. The roles of these planes are different among different modes.

FIG. 11 shows the arrangement of planes when an input document image is a black-and-white document image. Referring to FIG. 11, four planes are used for black-and-white gradation data for displaying the black-and-white document image on the LCD, and the other four planes are used as a memory for detecting closed loops and markers.

Meanwhile, for a color document or a black-and-white+color document, all the planes function as planes to store data for display on the LCD.

FIG. 12 is a diagram for use in illustration of how the role of a memory plane change depending upon the kind of a read document.

Referring to FIG. 12, as described above, for an input black-and-white document, memory planes of bits 4 to 7 are used for gradation data for displaying the black-and-white document, and bits 1–3 are used as codes for marker colors. The number "0" indicated by bits 1 to 3 represents a region without any marker, "1" a region in red, "2" a region in green, "3" a region in blue, "4" a region in cyan, "5", a region in magenta, and "6" a region in yellow.

The frame indicated by bit 0 is black-and-white binary data, and used to detect a closed loop present in the black-and-white document. Herein, the closed loop means a closed region delineated by a black line in the document. The user can designate the closed region by a marker or through type touch panel to color the region or hatch the region.

When an image in a read document is directly used as data to identify a closed loop, the line defining the closed loop may be sometimes disconnected depending on the characteristic of a CCD used and the closed loop may not be recognized successfully. As data in the plane of but 0, data produced by closing the line which defines the closed loop is stored. The closing processing will be described later.

Meanwhile, if a color document or a black-and-white+color document is input, data for display on the LCD is stored in bits 0 to 7 in all the memory planes. More specifically, one dot will be displayed by 8 bit data on the LCD. The input color document has its tonality lowered to the tonality which can be represented by the LCD display codes and stored in the memory.

Figure 13:
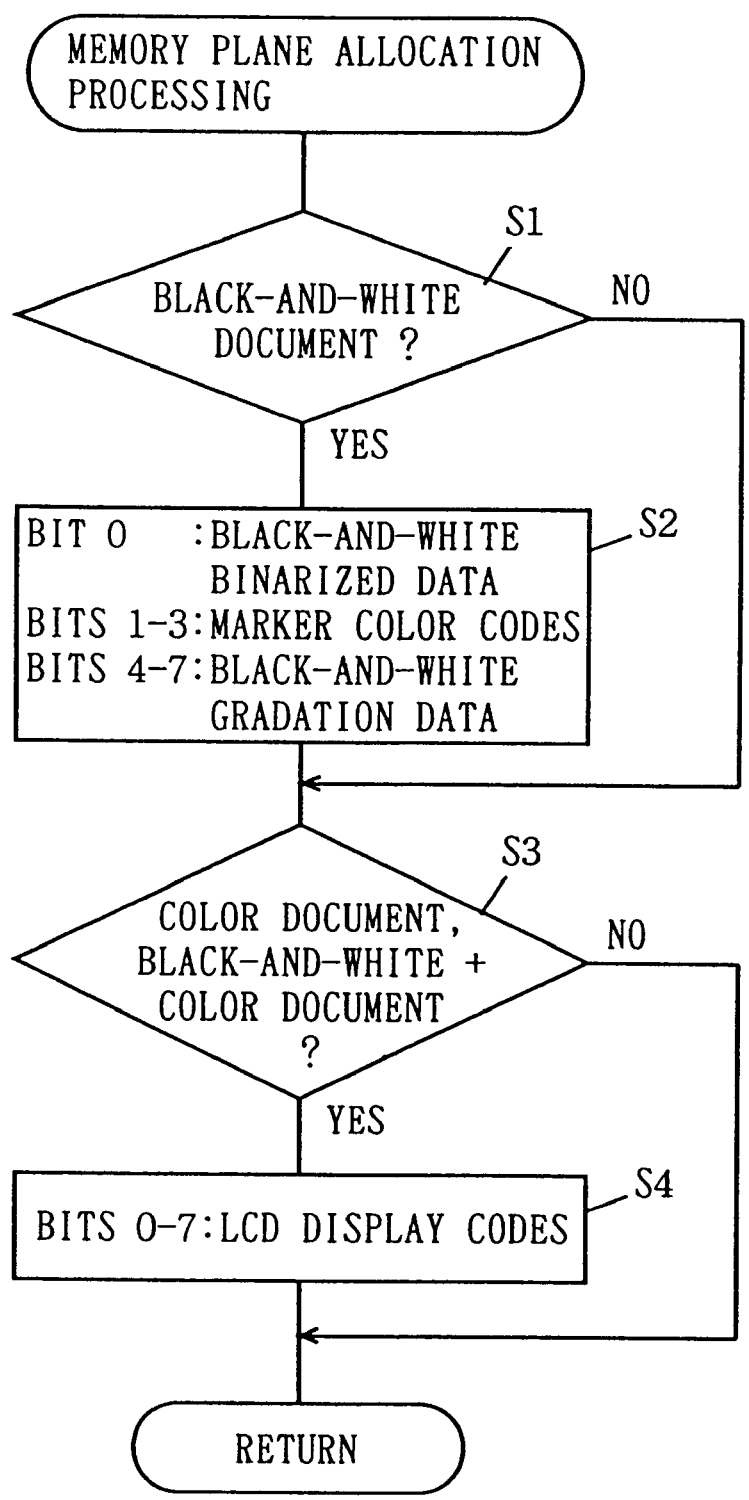
FIG. 13 is a flow chart for use in illustration of the processing of allocating memory planes.

Thus, the processing of switching the role of memory depending upon the content of an input document may be conducted by hardware, or maybe conducted by a flow as shown in FIG. 13.

Referring to FIG. 13, when the mode to process a black-and-white document is selected (YES in S1), the memory planes are allocated for the black-and-white document (S2). Meanwhile, the color document mode or the black-and-white+color document mode is set (YES in S3), the same memory planes for color are allocated (S4).

Figure 14:
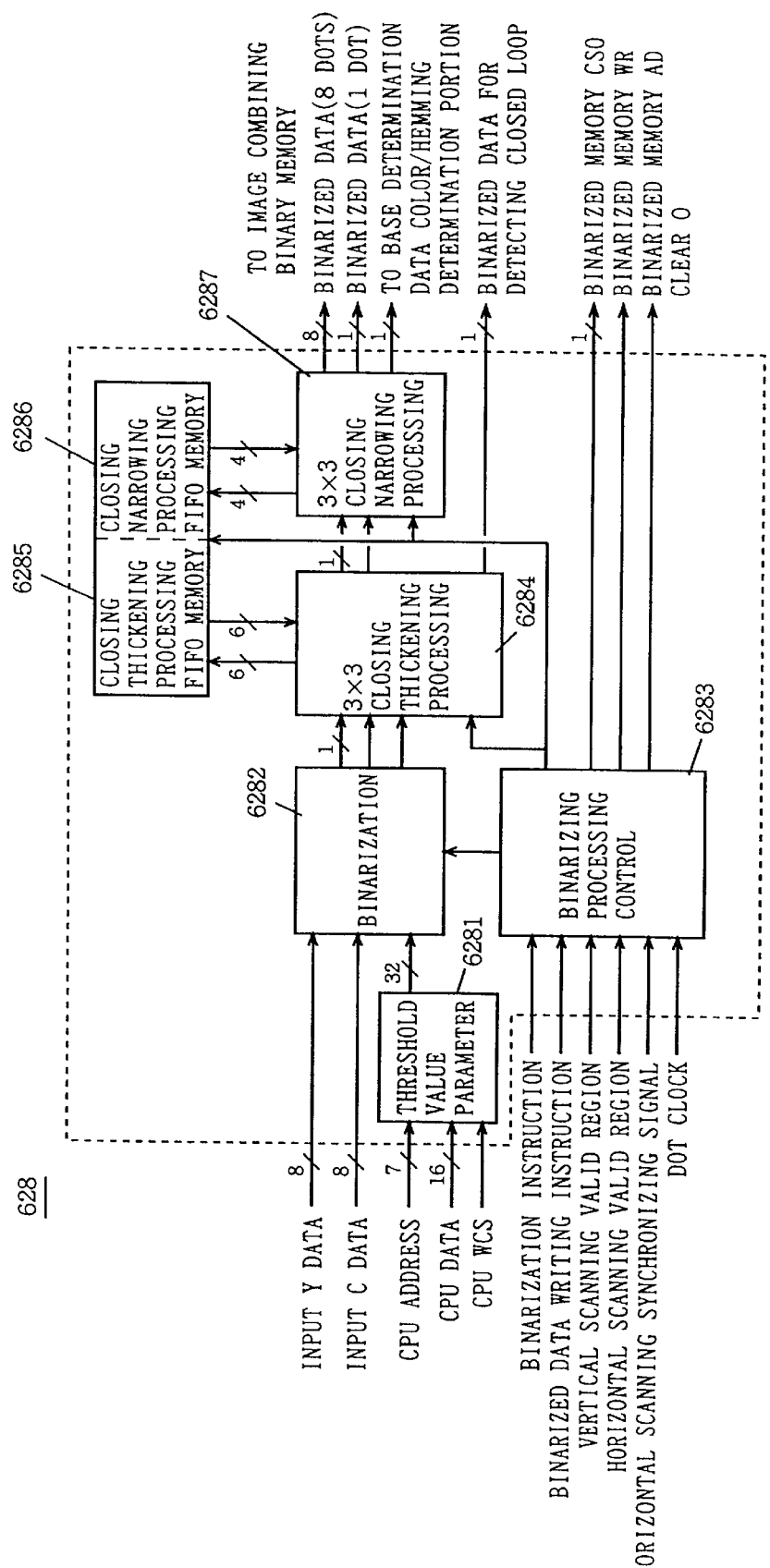
FIG. 14 is a block diagram showing the configuration of a binarizing processing portion 628.

FIG. 14 is a block diagram showing in detail the configuration of binarizing processing portion 628.

In the configuration, a binarized document image is produced based on the luminance signal (Y) and color saturation signal (C) of document information and threshold parameters. The binarized document image is subject to 3×3 dots closing processing and stored in the binary memory.

Referring to FIG. 14, the block includes a threshold parameter output portion 6281 for outputting threshold parameters, a binarizing processing portion 6282 for binarizing an input document image, a control portion 6283 for controlling the binarizing processing, a widening processing 6284 for widening the binarized document image for closing, a narrowing processing portion 6284 for narrowing the thickened document image, an FIFO memory 6285 used for the thickening processing and an FIFO memory 6286 for the narrowing processing.

Binarizing processing portion 6283 is provided with the luminance signal (Y) and color saturation (C) of document information. Threshold parameter output portion 6281 is provided with a CPU address, data from the CPU and a write clock signal from the CPU.

Binarizing processing control portion 6283 is provided with a binarizing instruction signal, a binarized data writing instruction signal, a vertical scanning valid region, a horizontal scanning valid region, a horizontal scanning synchronizing signal, and a dot clock.

Narrowing processing portion 6287 outputs binary data after closing, and base determination data. Widening processing portion 6284 outputs binary data for detecting a closed loop.

Binarizing processing control portion 6283 outputs a clock signal, a write signal and an address clear signal to the binary memory.

Now, referring to FIG. 15, the closing processing will be detailed.

During the closing processing, if there is at least one black pixel among 3×3 pixels around a pixel of interest (the pixel hatched in FIG. 15), a pixel of interest is processed as a black pixel (thickening processing), and then if there is at least one white pixel among 3×3 pixels, a pixel of interest is processed as a white pixel (narrowing processing).

Thus, the line defining the contour of the closed loop will have no disconnected part, and the contour can be accurately determined when the inside the loop is colored.

Figure 16:
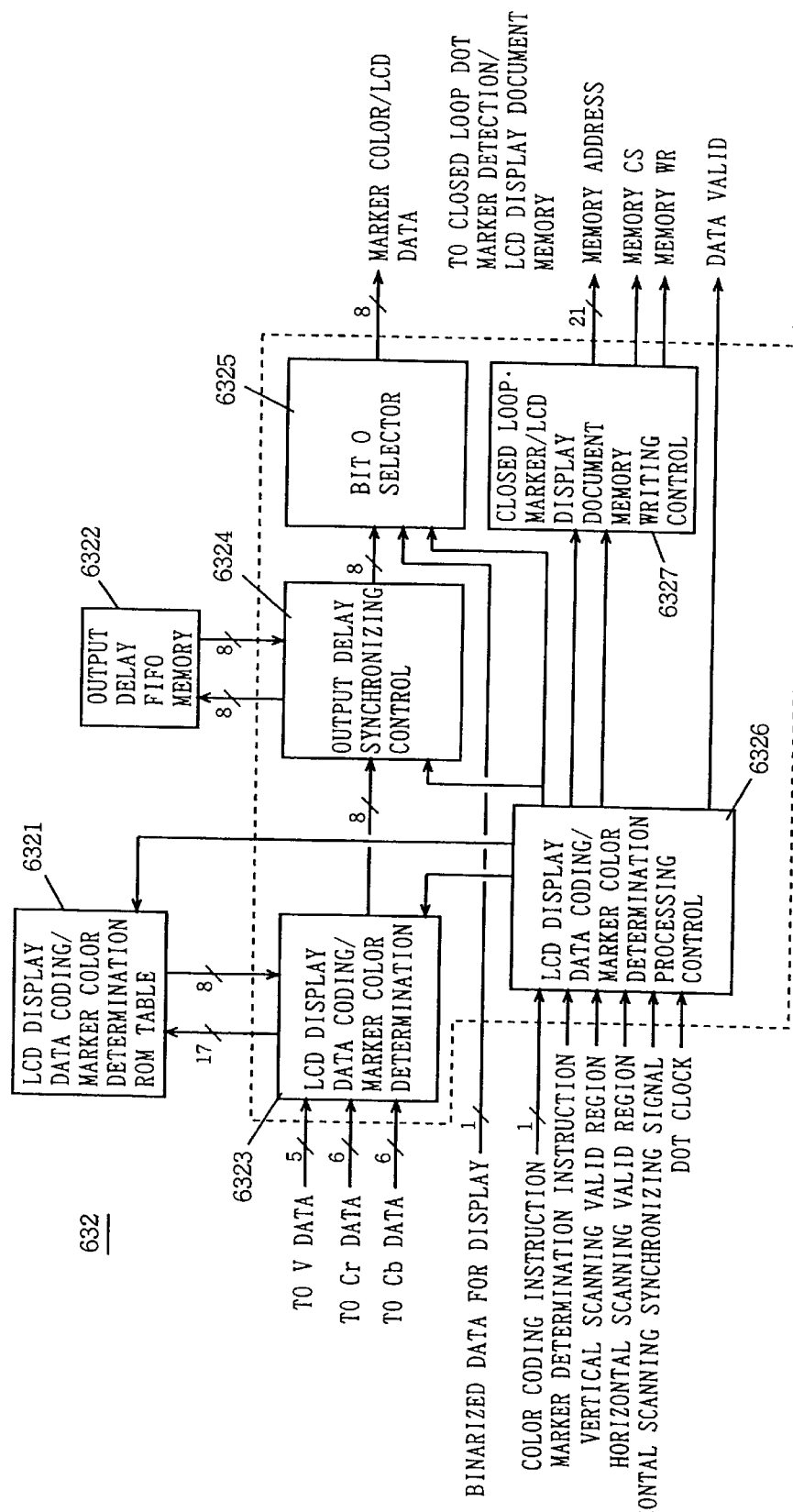
FIG. 16 is a block diagram showing the configuration of an LCD display color coding/marker color determination processing portion 632.

FIG. 16 is a block diagram showing in detail the configuration of LCD display color coding/marker color determination processing portion 632.

The processing portion converts input color document image data into color codes for display on the LCD in the color document editing mode.

In the black-and-white document editing mode, the processing portion divides the data produced by thinning the document input data into six kinds of color data (R, G, B, C, Y, M).

Data after 3×3-dot closing processing is used as black data.

The processing portion thins document information at 1/4 in the vertical scanning direction, the document image will be stored in the LCD display document memory/closed loop dot marker detection memory for each 4 lines.

Referring to FIG. 16, processing portion 632 includes a determination portion 6323 for LCD display data coding/marker color determination based on input image data, an LCD display data coding/marker color determination processing control portion 6326 for controlling the determination, an output delay synchronizing control portion 6324, a bit 0 selector 6325 to output marker color/LCD display data, a closed loop.marker LCD display document memory writing control portion 6327, an ROM table 6321 for LCD display data coding/marker color determination, and an output delay FIFO memory 6322.

Now, a method of determining a marker color and a method of color coding a document will be described.

A marker color is determined by referring to the ROM table using input image data of V, Cr, and Cb thinned at 1/4 as ROM addresses. Black-and-white binary data is produced by thinning binary data for display output from the binarizing processing portion at 1/4 and output in synchronization with marker color determination data.

Document color coding is performed by referring to the ROM table using input image data of Y, Cr and Cb thinned at 1/4 as ROM addresses.

Now, the procedure of operating the copying machine shown in FIG. 1 will be described.

Figure 17:
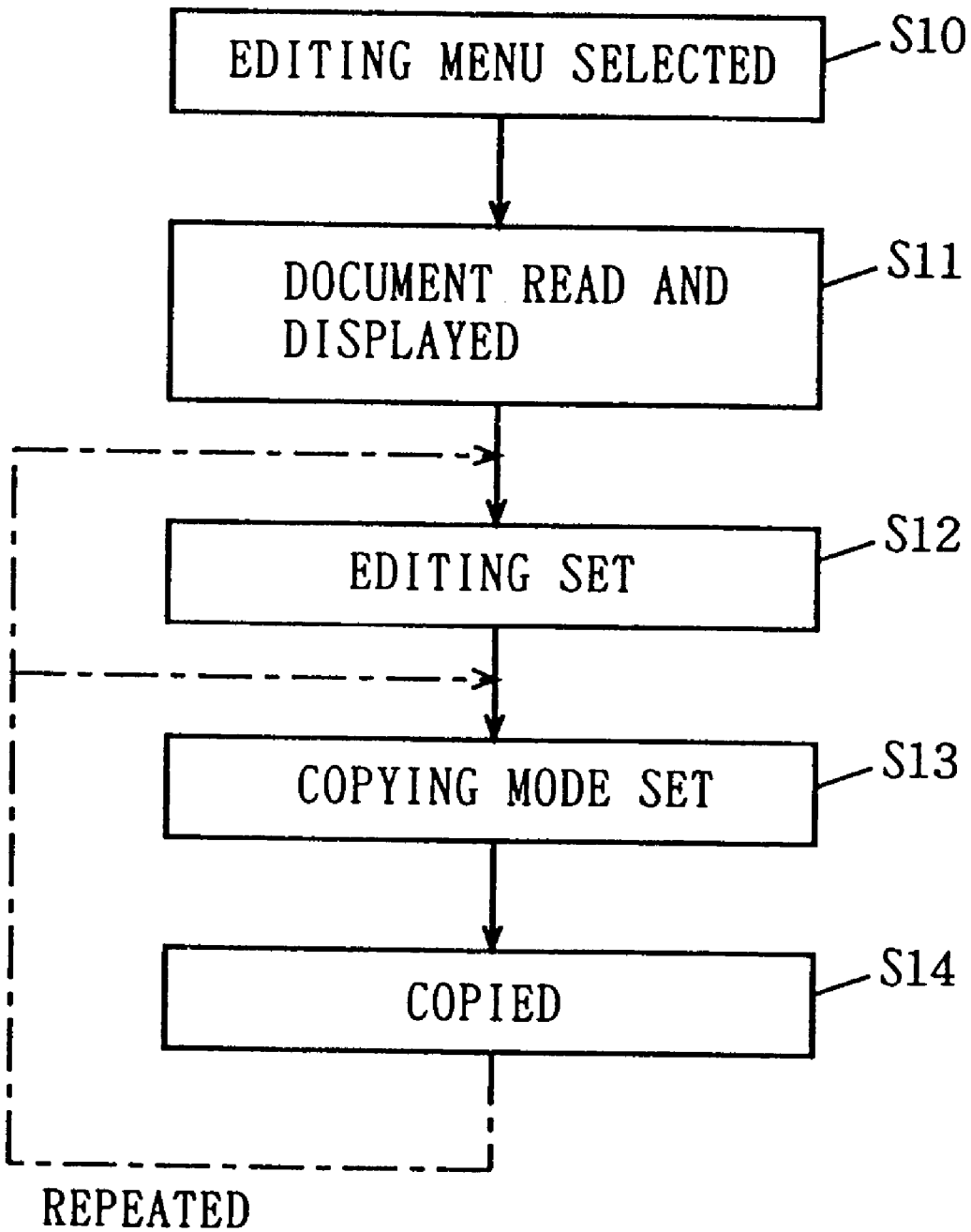
FIG. 17 is a flow chart for use in illustration of the procedure of operating the copying machine shown in FIG. 1.

FIG. 17 is a flow chart for use in illustration of the procedure of operating the copying machine.

Referring to FIG. 17, the operator selects a desired menu among display editing menus (S10). Based on the content of the selected menu, a document is read and the read content is displayed on the screen editor (S11). The operator sets an editing content through the screen editor by viewing the content of the document displayed (S12). Then, a copy mode including the sheet size, the magnification and number of copies is set (S13). Then, an edited copy is output (S14).

Figure 18:
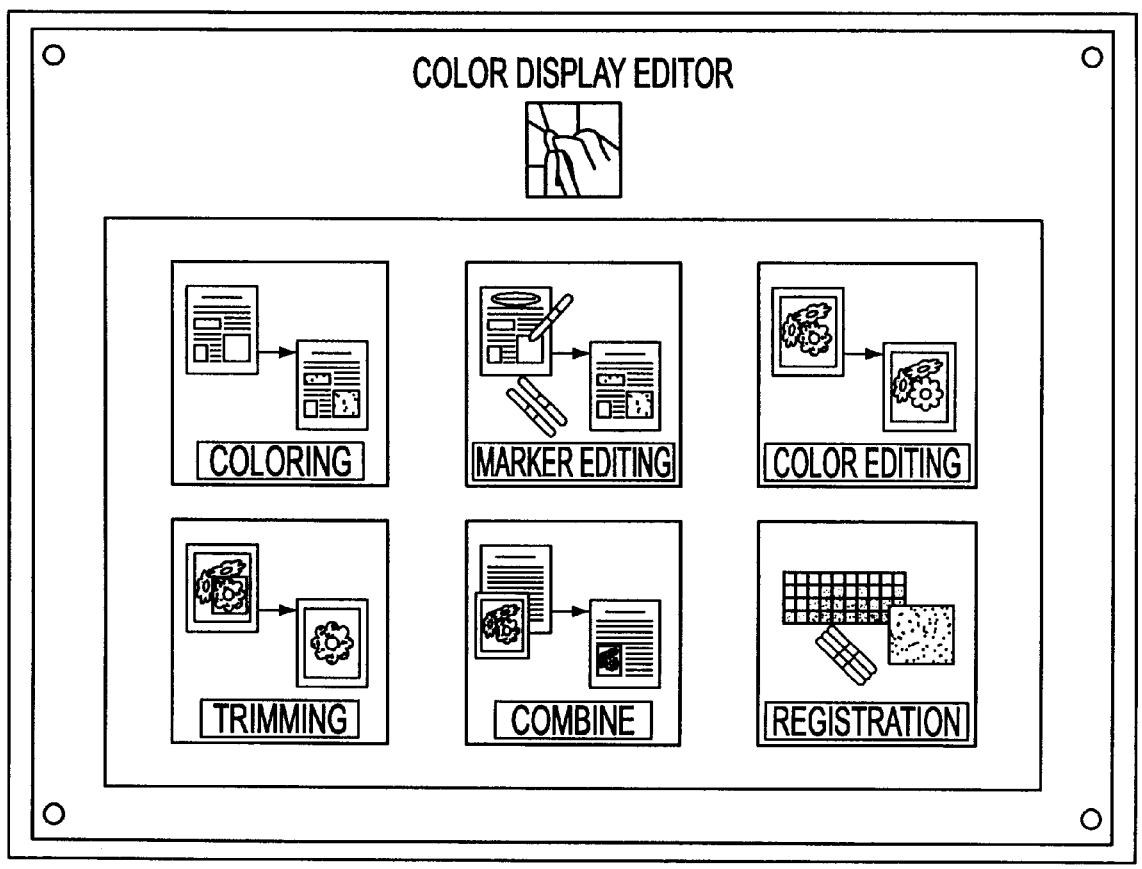
FIG. 18 shows an example of an editing menu.

FIG. 18 is a view showing examples of editing menus. The content shown in FIG. 18 are displayed on the LCD.

The menus include five purpose-specific editing menus, and a single registration menu.

In the coloring editing, characters or the base in a black-and-white document are colored.

In the marker editing, in a black-and-white document having an area designated by the marker pen, the area is colored.

In color editing, in a color document, various color editing processings such as color conversion, monochrome/color filtering are performed. The black-and-white portion of the color document may be colored.

In the trimming editing, part of a color or black-and-white document may be trimmed.

In the combining editing, a color document may be fit in a black-and-white document. In this editing, a black-and-white-document may be colored.

The registration refers to registration of a color palette or patterns as will be described.

Figure 19:
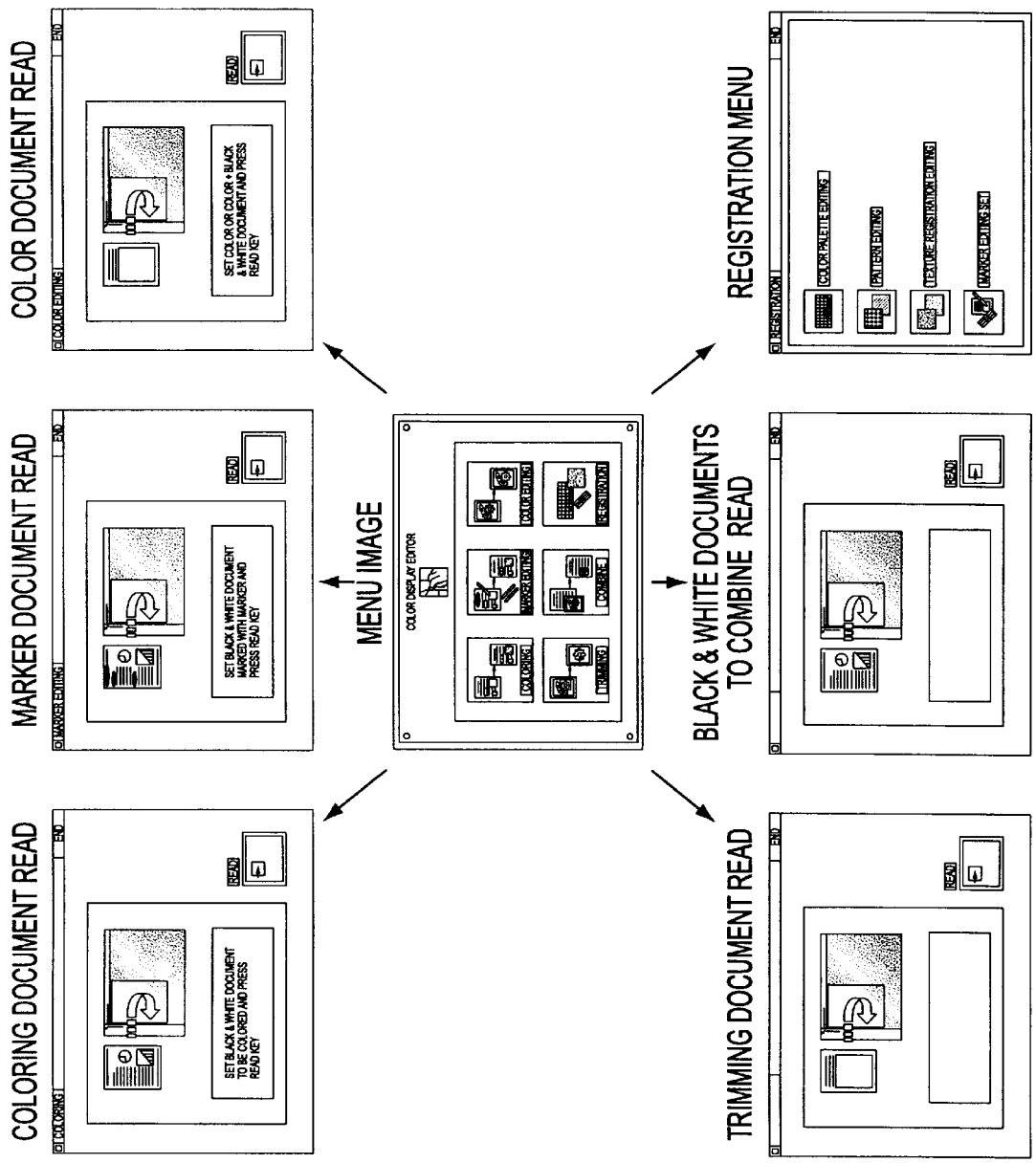
FIG. 19 shows images displayed when an operator presses the buttons in the editing menu.

The user can select a desired editing menu among them through the touch panel. Once a menu is selected, an image corresponding to each content will be displayed as shown in FIG. 19.

Figure 20:
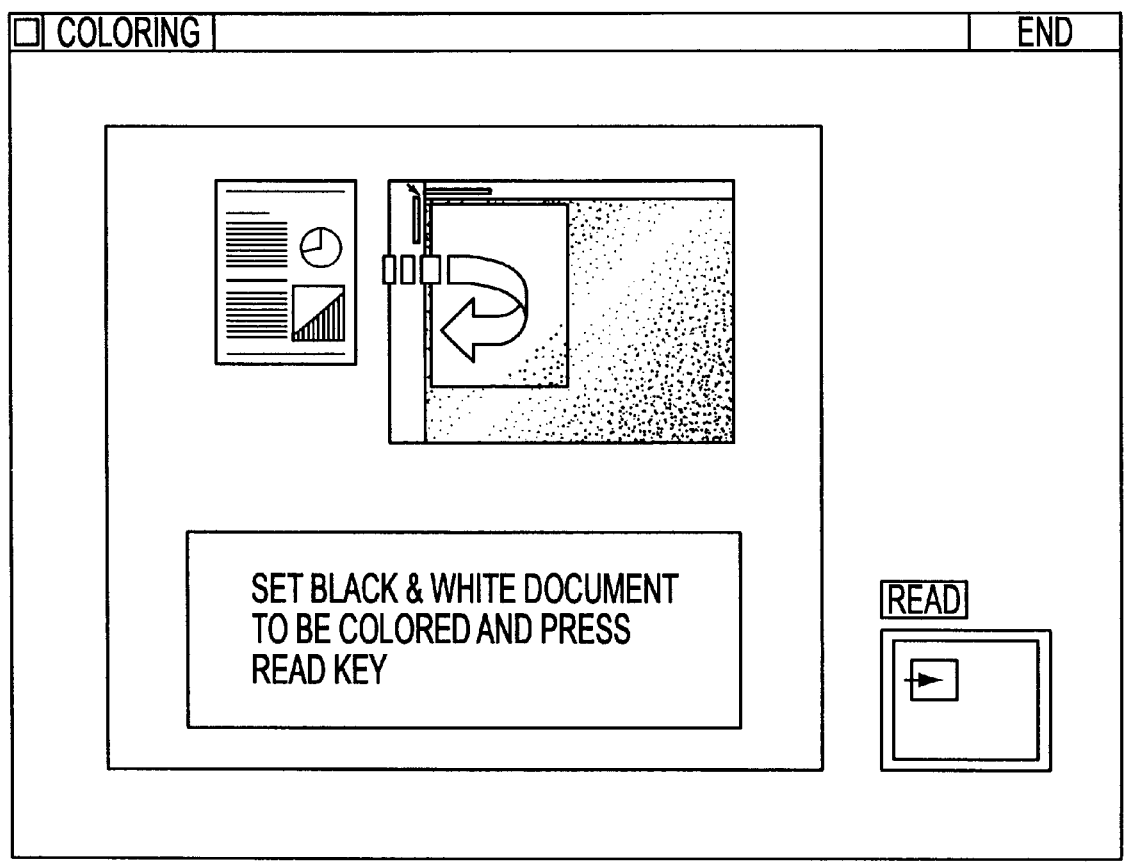
FIG. 20 shows an image displayed when a coloring mode is selected.
Figure 21:
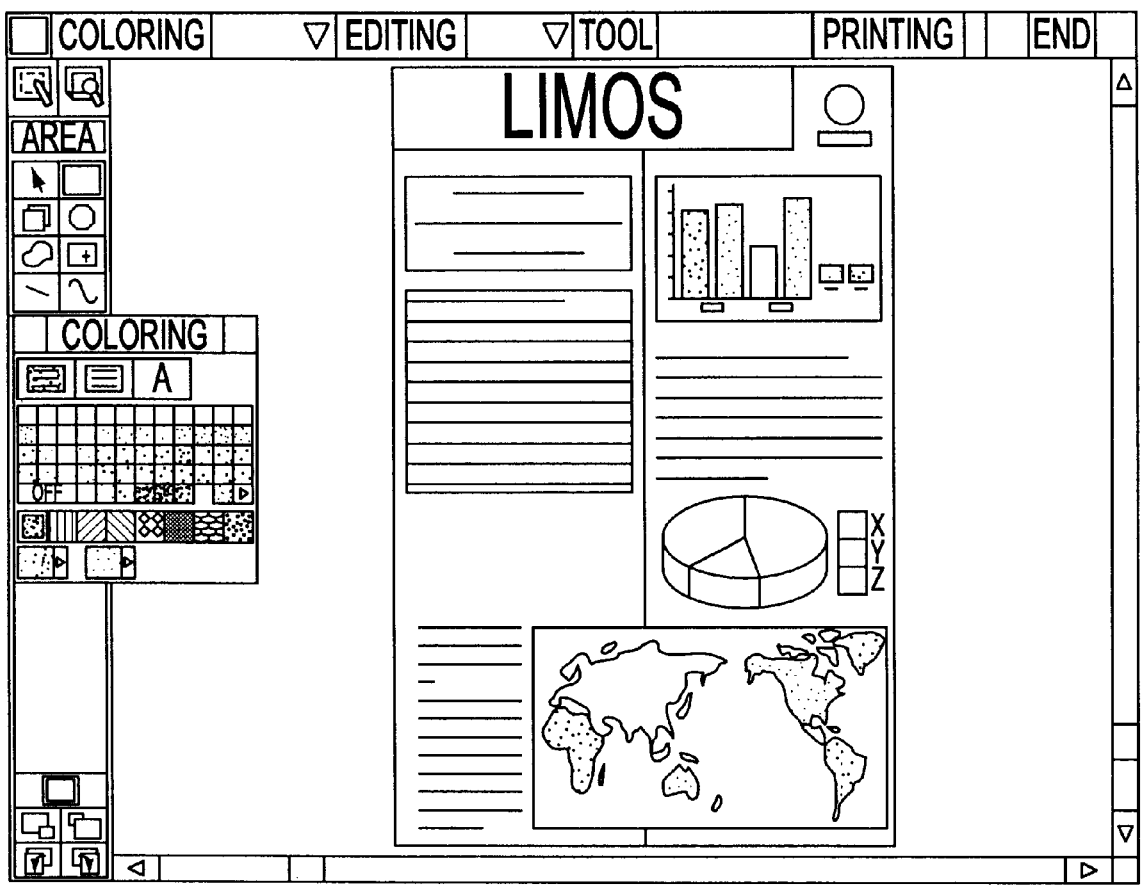
FIG. 21 shows an image displayed during the processing of coloring a black-and-white document.

Now, an image when the coloring editing is selected is shown in FIG. 20. The user sets a black-and-white document to be colored according to the displayed message and presses a read key (lower right in the image). Then, the black-and-white document is read, and the image of the document is displayed on the LCD. In the state, the displayed document image is colored through the touch panel as shown in FIG. 21, and a colored copy is output from the printer.

Figure 22:
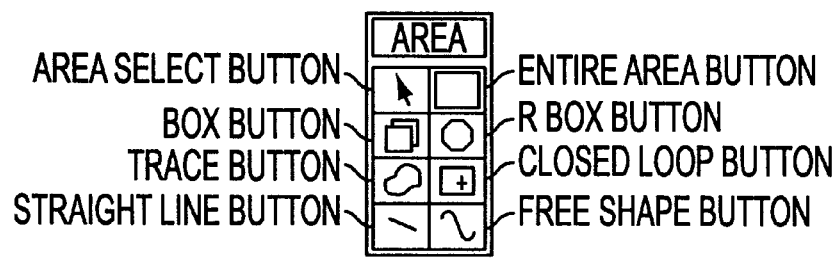
FIG. 22 shows an area designation tool.

In the coloring, an area designation tool as shown in FIG. 22 is used. The area designation tool includes an area select button to select a designated area, an entire document button for the entire document, a box button to designate a rectangular area, an R box button to designate a round rectangular area, a trace button to designate an area in a desired shape, a close loop button to designate an area in a closed loop, a linear button to draw a straight line, and a free shape button to draw a desired shape.

Herein, the box button is a button to designate a rectangle as an area to be colored and the rectangle is defined by two points, the starting point and ending point by dragging the pen.

Figure 23:
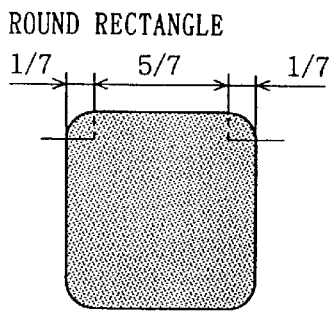
FIG. 23 shows the shape of an R box.

The R box is a button to designate a square with its corners rounded off which is defined by two points, the starting point and ending point by dragging the pen. The round rectangle is shown in FIG. 23.

Figure 24:
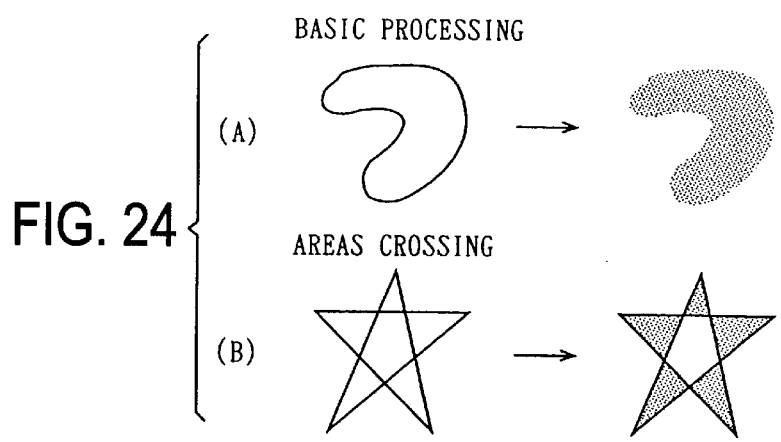
FIG. 24 shows processings by the trace button.

The trace button is a button to designate a closed free shape area with the starting point and ending point designated by dragging the pen. As a basic processing in the area designation by the trace button as shown in FIG. 24 at (A), an area surrounded by a trace line is extracted as a target area. If areas cross each other as shown in FIG. 24 at (A), the crossing area is extracted as a target area. In FIG. 24, the hatched region corresponds to a target area for processing.

The closed loop button is a button to designate an area closed in a black frame around the position input by the pen as a target area. The closed loop area processing proceeds as shown in FIG. 25.

More specifically, as a basic processing, the area surrounded by the black frame is extracted as a closed loop area (FIG. 25(A)). If there is another closed loop in a closed loop, the area surrounded by the outer black frame is extracted as a closed loop area (FIG. 25(B)). The inner closed loop area is not recognized. Thus, closed loops present in alphabet "B" for example is not identified.

Figure 25:
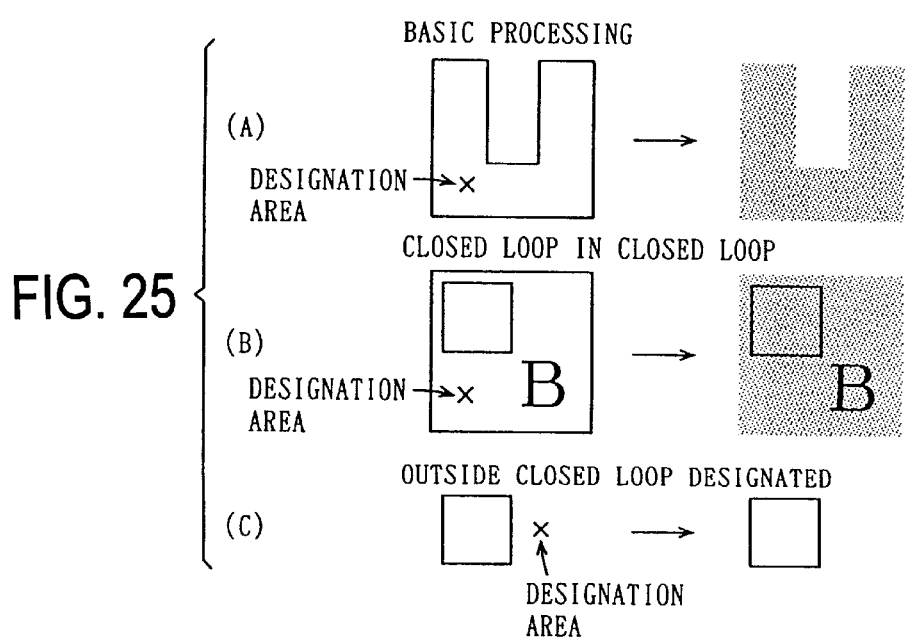
FIG. 25 shows processings by the closed loop button.

If a portion outside the closed loop is designated, the area is not recognized as a closed loop area (FIG. 25 (C)).

Figure 26:
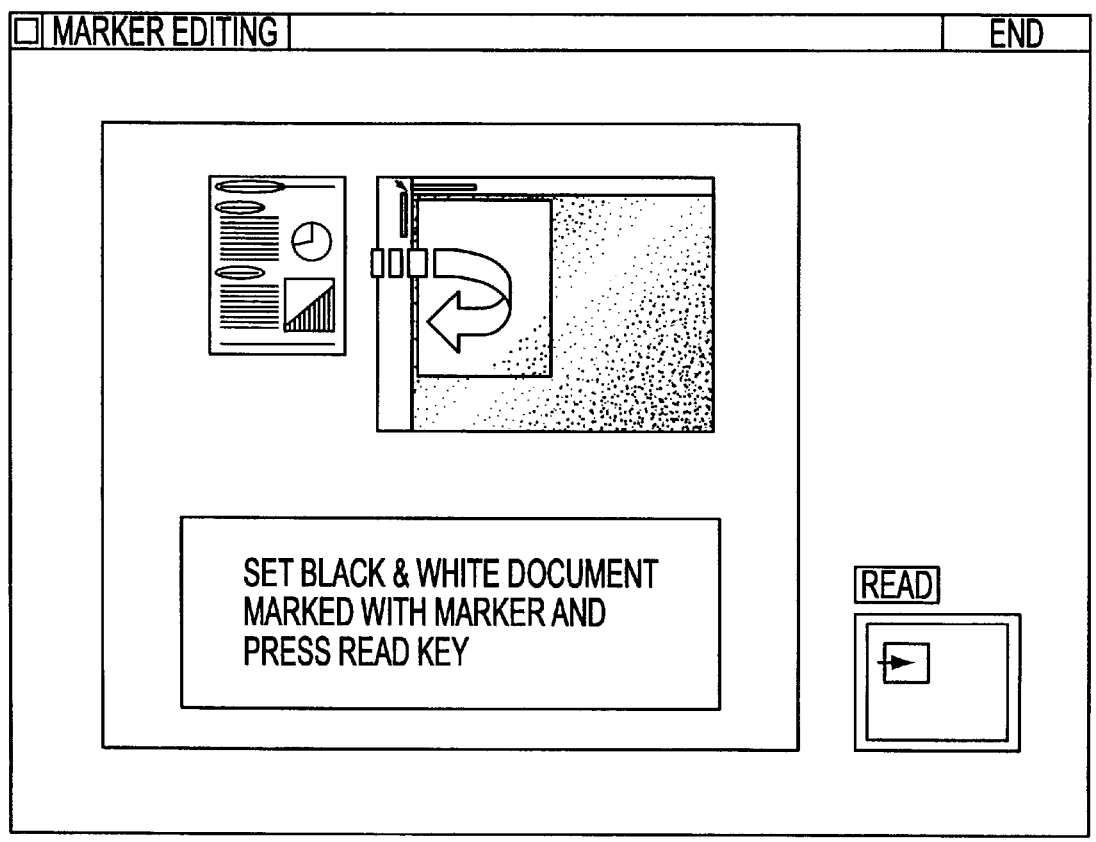
FIG. 26 shows an image displayed in a marker editing mode.

FIG. 26 shows an image when the marker editing mode is designated.

Figure 27:
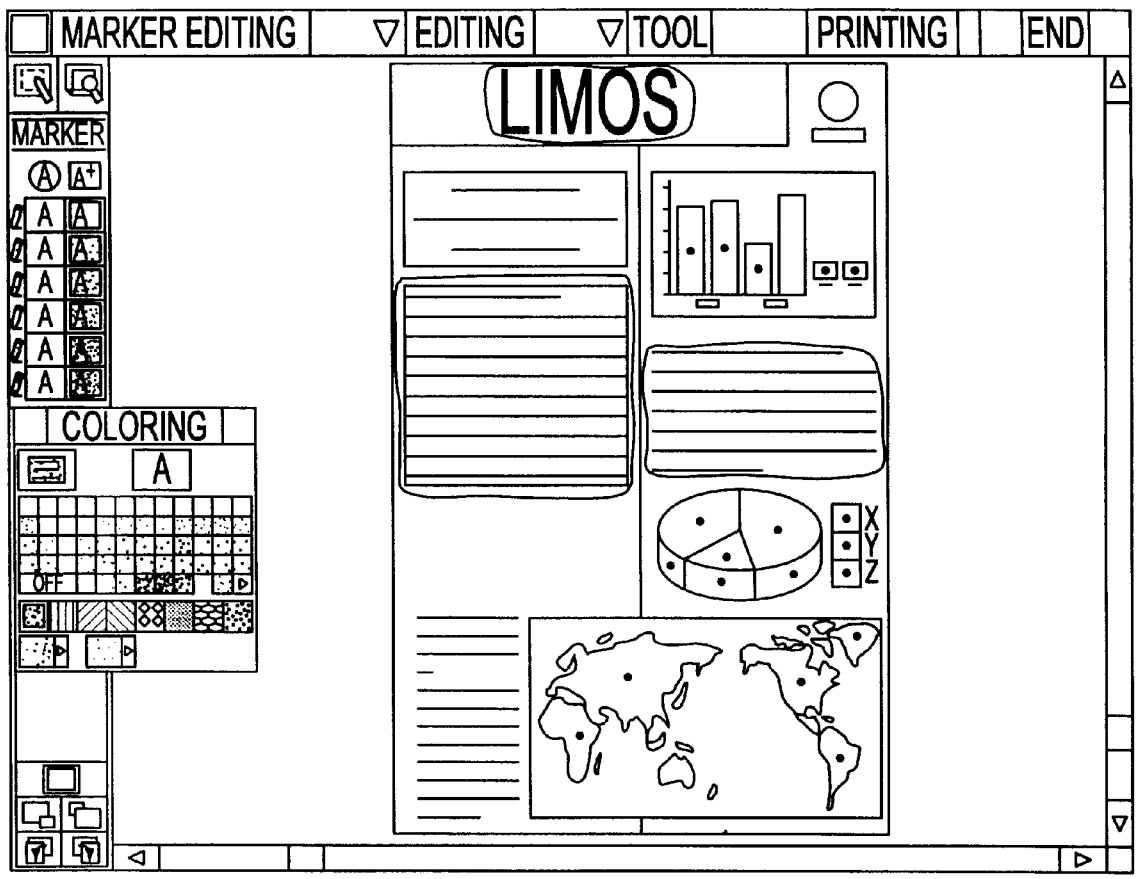
FIG. 27 is an image displayed during marker editing.

Referring to FIG. 26, the operator sets a marker-processed black-and-white document to IR, presses the read key according to the displayed content shown in FIG. 26, and the marker document is read. The read marker document is displayed on the LCD as shown in FIG. 27. The marker designation is made by designating an area desired to be edited with a marker (surrounding frame designation) or by designating an area within a closed loop by marking dots with a marker within a closed loop of the document (dot designation).

Figure 28:
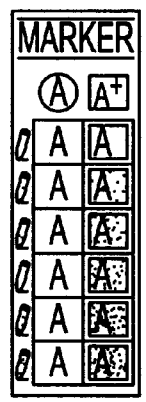
FIG. 28 shows a marker area designation tool.

A further marker area may be designated to a document displayed on the LCD, in which case the marker area designation tool shown in FIG. 28 is used. The marker area designation tool can designate yellow, magenta, cyan, green, red and blue, and the surrounding frame designation and dot designation can be made for each color.

Figure 29:
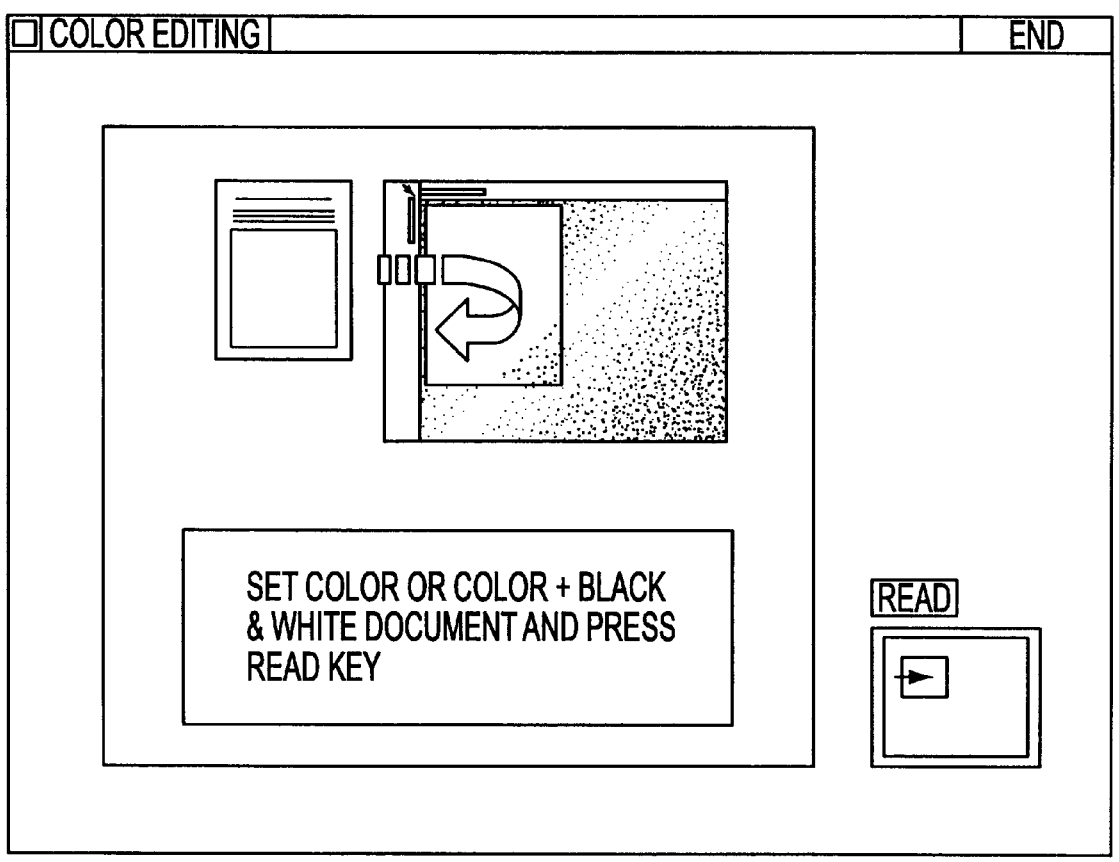
FIG. 29 is an image displayed when a color editing mode is selected.
Figure 30:
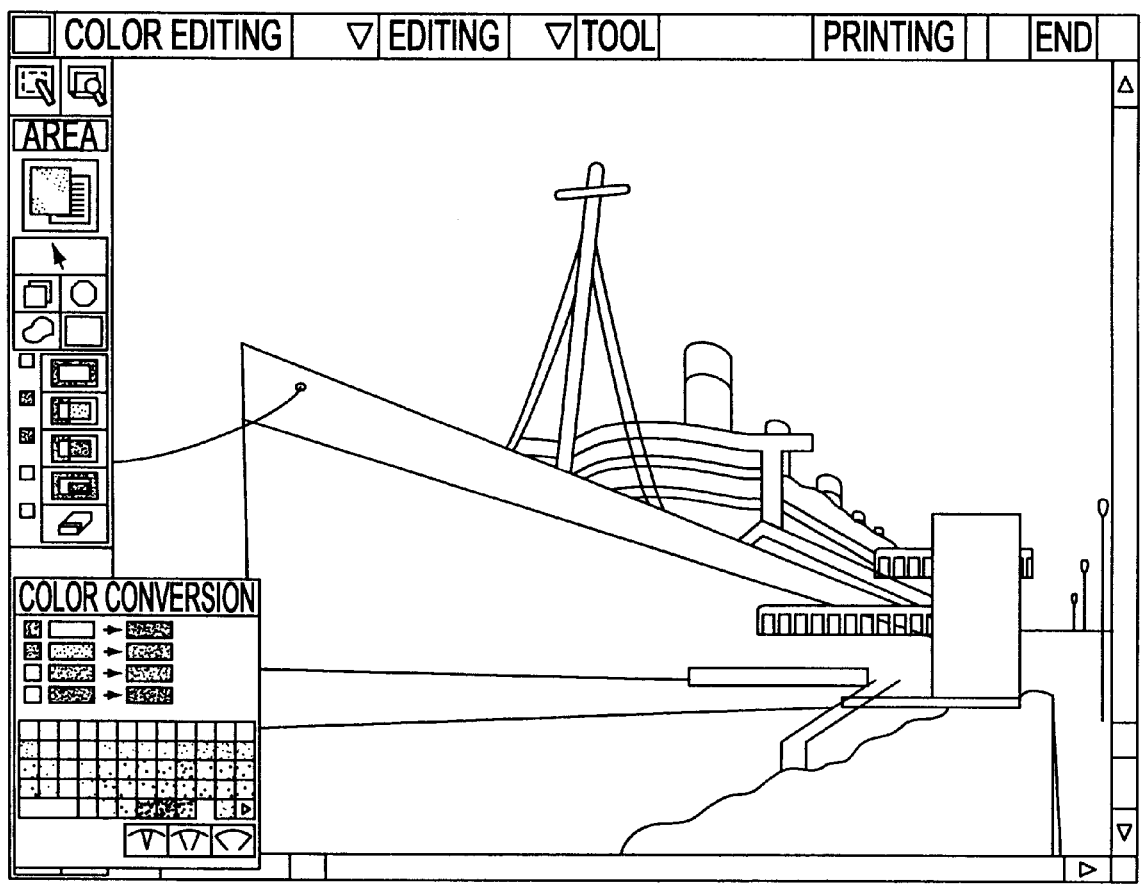
FIG. 30 shows an image read from a color document and displayed.

FIG. 29 shows an image when the color editing mode is designated. The operator sets a color document or a color+black-and-white mixture document to process at the IR according to the message displayed in the image and presses the read key. Thus, the color document is read, and displayed on the LCD as shown in FIG. 30. The user designates color conversion, for example, through the touch panel to the color document.

Figure 31:
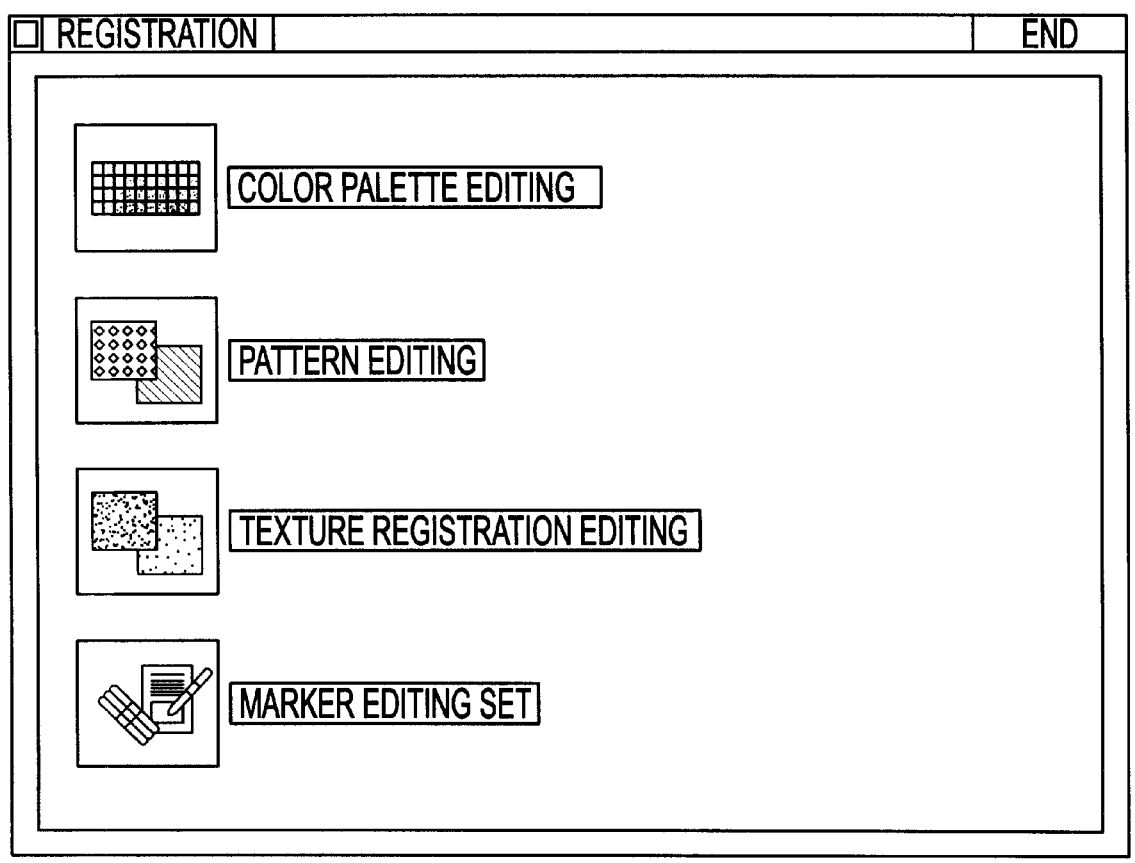
FIG. 31 shows an image displayed when a registration processing is selected.

In FIG. 18, if the registration mode is selected, the image shown in FIG. 31 is displayed on the LCD.

Figure 32:
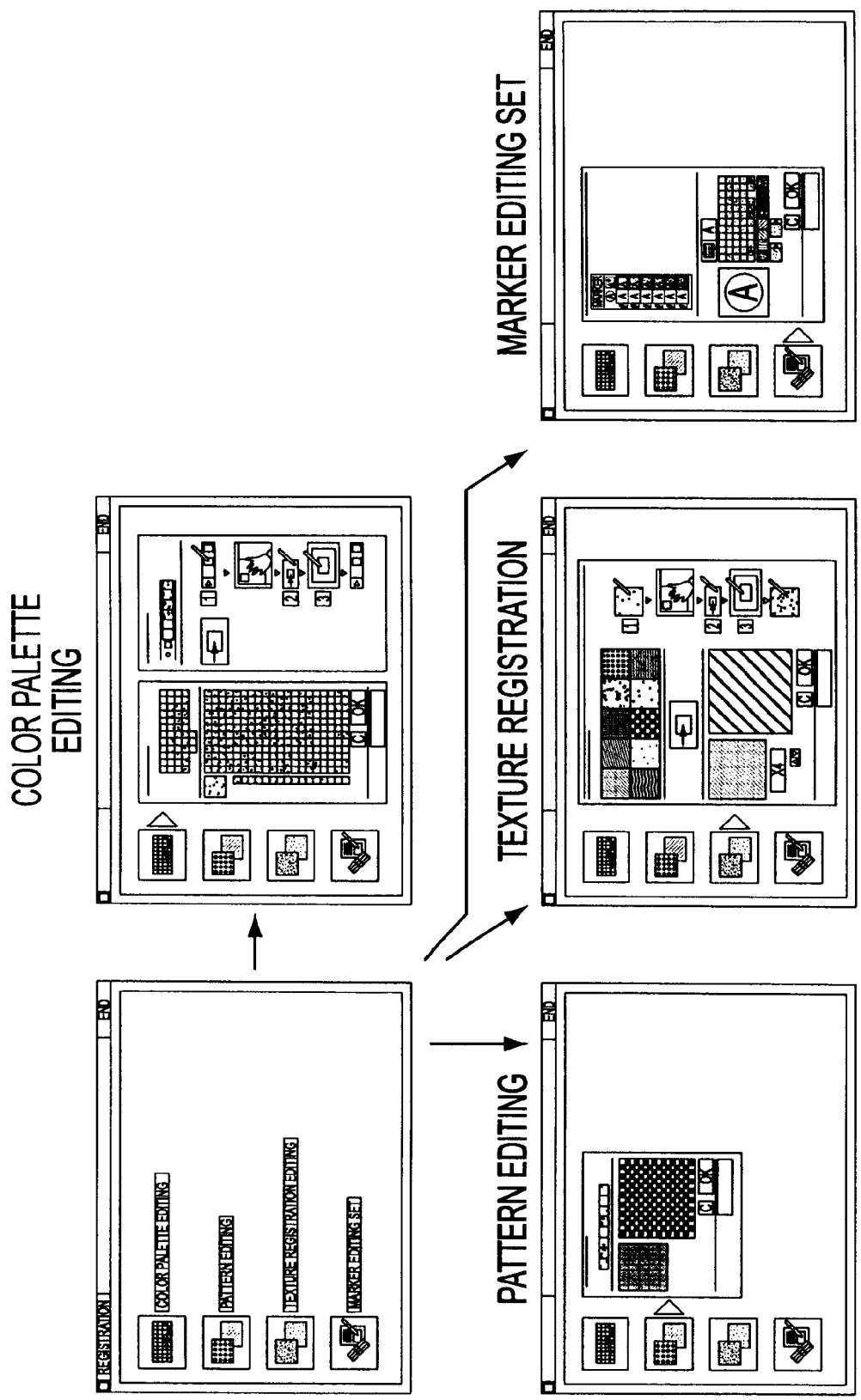
FIG. 32 shows an image displayed after the operator presses the touch panel as the image in FIG. 31 is displayed.

There are four kinds of registration menus. In the color palette editing, colors are registered, the standard color palette, and colors to register are read. In the pattern editing, the pattern editing is made for coloring the background. In the texture registration, the texture pattern is read for registration. In the marker editing setting, a standard (default) editing mode for marker editing is set. As shown in FIG. 32, an image corresponding to the content of each button pressed by the operator is displayed for registration.

Figure 33:
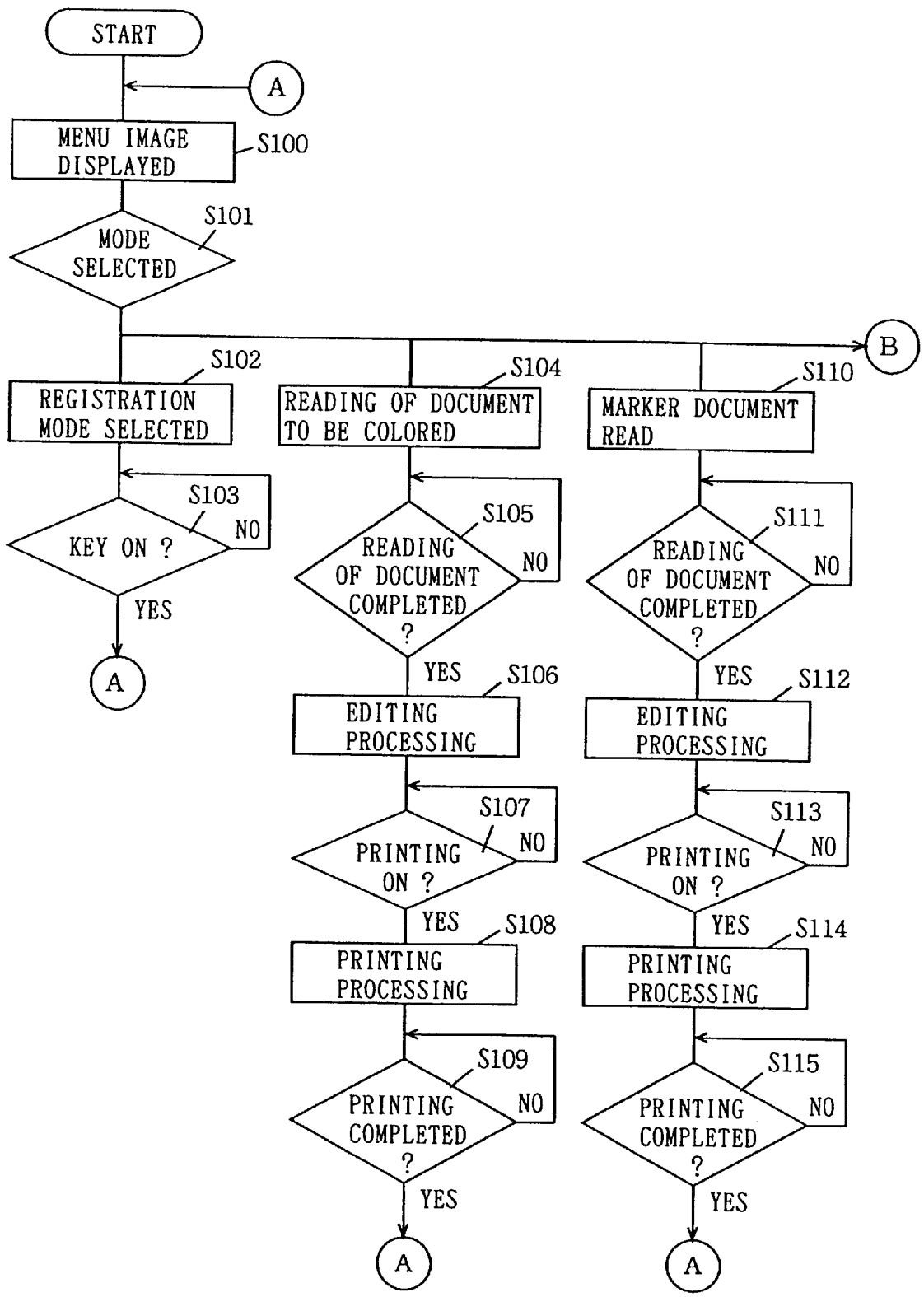
FIG. 33 is a flow chart for use in illustration of a routine of displaying images for operating the copying machine in FIG. 1.
Figure 34:
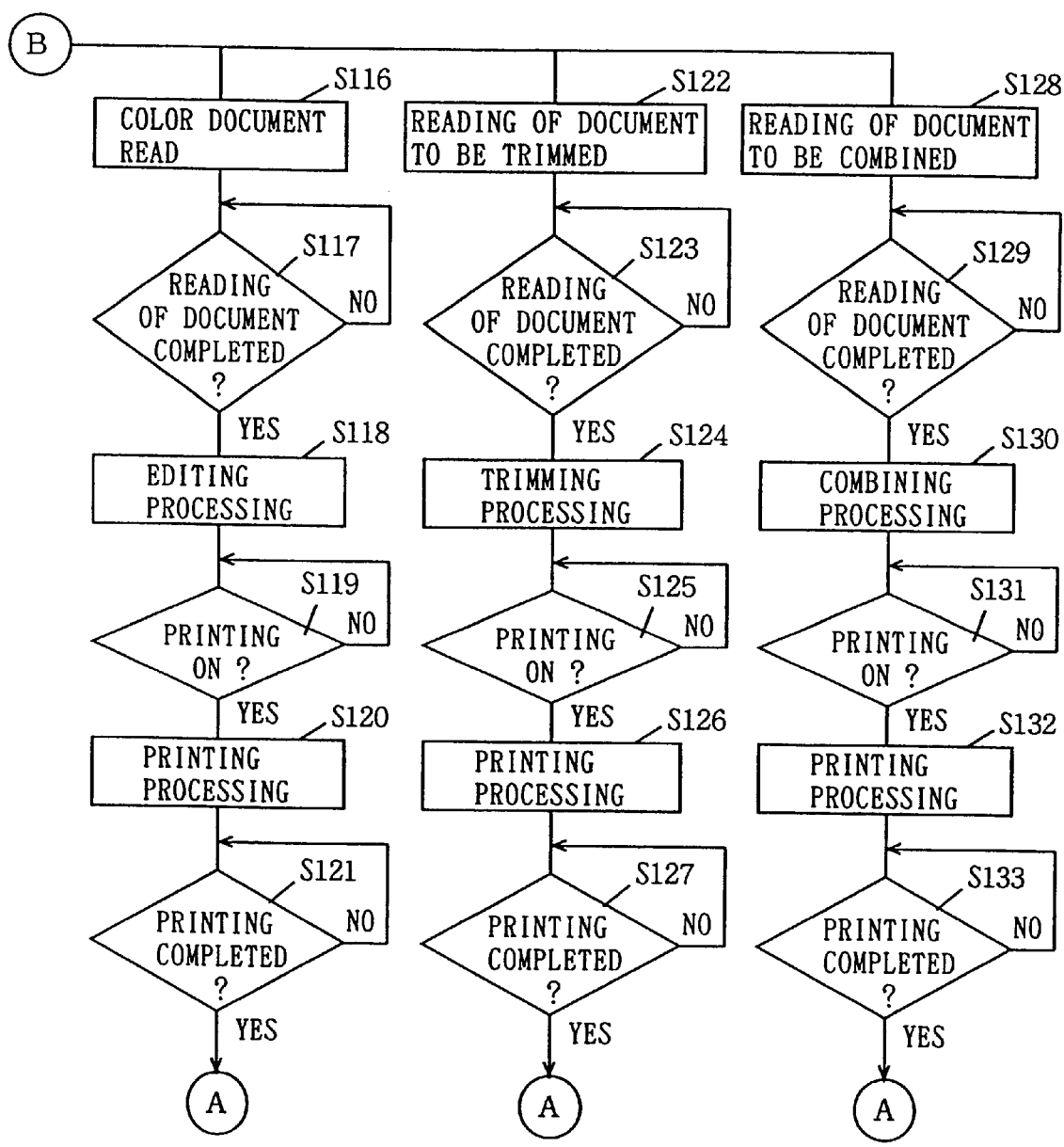
FIG. 34 is the continuation of the flow chart shown in FIG. 33.

FIG. 33 is a flow chart for use in illustration of the processing of displaying images for operating the digital color copying machine according to this embodiment. FIG. 34 is the continuation of the flow chart shown in FIG. 33.

Referring to FIG. 33, once the machine is activated, in step S100, the editing menu image shown in FIG. 18 is displayed. In step S101, the process is branched depending on a mode selected by the user.

If "registration" is selected, the registration menu as shown in FIG. 31 is displayed in step S102, and various setting images are displayed according to the user's selection for registration as shown in FIG. 32. In step S103, it is determined whether there has been a key input, and the processing from step S100 is once again executed if the answer is YES.

Meanwhile if "coloring editing" is selected, the image shown in FIG. 20 is displayed in step S104, and reading of a document to be colored is initiated. In step S105, it is determined if the reading of the document has been completed, if the answer is YES, the editing image shown in FIG. 21 is displayed in step S106, and the user performs an editing processing. After the editing processing, it is determined in step S107 if the print key has been turned on, and if the answer is YES, a printing processing is executed in step S108. It is determined in step S109 if the printing processing has been completed, and if the answer is YES, the processing from step S100 is once again executed.

In the mode selecting image, if "marker editing" is selected, the image shown in FIG. 26 is displayed in step S110, and reading of a black-and-white document processed with markers is initiated. It is determined in step S111 if the reading of the document has been completed, if the answer is YES, the editing image shown in FIG. 27 is displayed in step S112, and an editing processing by the user is performed. It is determined in step S113 if the print key has been turned on after the editing processing, and if the answer is YES, the printing processing is executed in step S114. Then, it is determined in step S115 if the printing processing has been completed, and if the answer is YES, the processing from step S100 is once again executed.

In the editing menu, if "color editing" is selected, the image shown in FIG. 29 is displayed in step S116, and a color document is to be read. It is determined in step S117 if the reading of the document has been completed, if the answer is YES, the editing image shown in FIG. 30 is displayed in step S118, and an editing processing corresponding to the input by the user is executed. It is determined in step S119 if the print key has been turned on after the editing processing, and if the answer is YES, a printing processing is executed in step S120. It is determined in step S121 if the printing processing has been completed, and if the answer is YES, the processing from step S100 is once again executed.

In the editing menu, if "trimming" is selected, a document to be trimmed is read in step S122. It is determined in step S123 if the reading of the document has been completed, and if the answer is YES, a trimming processing corresponding to the input by the user is executed in step S124.

It is then determined in step S125 if the print key has been turned on, and if the answer is YES, the printing processing is executed in step S126. It is determined in step S127 if the printing processing has been determined, and if the answer is YES, the processing from step S100 is once again executed. In the editing menu, if "combining" is selected, documents to be combined are read in step S128. It is then determined in step S129 if the reading of the documents has been completed, and if the answer is YES, a combining processing corresponding to the input by the user is executed in step S130.

It is then in step S131 if the print key has been turned on, and if the answer is YES, the printing processing is executed in step S132. It is determined if the printing processing has been completed in step S133, and if the answer is YES, the processing from step S100 is again performed.

As in the foregoing, in the copying machine according to this embodiment, the operator can confirm the result of editing before outputting a copy, copying fault may be reduced, thus making the machine easier to use.

In addition, data which has gone through the closing processing may be used for detecting closed loop, and therefore, close loops may be more accurately detected. An image as read without any such closing processing can be displayed LCD if desired, and therefore the image suitable for the operator to view can be displayed on the LCD.

Furthermore, depending on the reading mode (black-and-white document/color document), the memory plans of the LCD display memory are used in different ways, a document read at the most preferable image quality for an image to be read can be displayed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image editing apparatus, comprising:
   means for reading a document image and obtaining image data corresponding to the document image;
   first storage means for storing said image data;
   processing means for processing said image data into data used to recognize a closed region provided in said document image;
   second storage means for storing said processed image data; and
   a display for displaying an image based on the processed image data stored in the second storage means.

2. The image editing apparatus as recited in claim 1, further comprising a memory, said memory having a first storage region and a second storage region for one address, said first storage region including said first storage means, and said second storage region including said second storage means.

3. The image editing apparatus as recited in claim 1 further comprising means for editing said document image based on said processed data, and means for displaying a result of editing based on the result of editing by said editing means and the image data stored by said first storage means.

4. The image editing apparatus as recited in claim 3 further comprising a memory, said memory having first and second storage regions for one address, said first storage region including said first storage means and said second storage region including said second storage means.

5. An image editing apparatus comprising: means for setting either of a color mode and a monochrome mode;
   means for reading a document image and obtaining image data corresponding to the document image;
   storage means for storing said image data in a manner corresponding to said set mode, storing the image data of the color mode at a high resolution and storing the image data of the monochrome mode at a low resolution; and
   means for editing said document image based on said stored image data.

6. The image editing apparatus as recited in claim 5, wherein
   said document image is a colored document image, said obtaining means obtains color image data, said plurality of modes include a first mode for editing a color image, and said storage means reduces the number of colors of said obtained color image data for storage into a number which can be displayed on the display when said first mode is set by said setting means.

7. The image editing apparatus as recited in claim 5, wherein said plurality of modes including a second mode for editing a region marked by a marker, and said storage means stores data for displaying said document image based on said obtained image data and data to identify the region marked by said marker, when said second mode is set by said setting means.

8. The image editing apparatus as recited in claim 7, wherein said document image is a colored document image, said obtaining means obtains color image data, said plurality of modes include a first mode for editing a color image, and said storage means reduces the number of colors of said obtained color image data for storage to a number which can be displayed on the display, when said first mode is set by said setting means.

9. The image editing apparatus as recited in claim 7, wherein said plurality of modes include a third mode for editing a closed region provided in said document image, and said storage means stores data for displaying said document image based on said obtained image data and data to identify said closed region, when said third mode is set by said setting means.

10. The image editing apparatus as recited in claim 9, wherein said document image is a colored document image, said obtaining means obtaining color image data, said plurality of modes include a first mode for editing a color image, and said storage means reduces the number of colors of said obtained image data for storage to a number which can be displayed on the display, when said first mode is set by said setting means.

11. The image editing apparatus as recited in claim 5, wherein said plurality of modes include a third mode for editing a closed region provided in said document image, and said storage means stores data for displaying said document image based on said obtained image data and data to identify said closed region, when said third mode is set by said setting means.

12. The image editing apparatus as recited in claim 11, wherein said document image is a colored document image, said obtaining means obtains color image data, said plurality of modes include a first mode for editing a color image, and said storage means reduces the number of colors of said obtained color image data for storage to a number which can be displayed on the display, when said first mode is set by said setting means.

13. A method of editing an image, comprising the steps of:

reading a document image and obtaining image data corresponding to the document image;

storing said image data;

processing said image data into data used for recognizing a closed region provided in said document image; and displaying an image based on the processed image data.

14. The method as recited in claim 13, further comprising the steps of:

editing said document image; and displaying a result of editing based on said result of editing and said storage image data.

15. A method of editing an image, comprising the steps of:

setting either of a color mode and a monochrome mode;

reading a document image and obtaining image data corresponding to the document image;

storing said image data in a manner corresponding to said set mode, storing the image data of the color mode at a high resolution and storing the image data of the monochrome mode at a low resolution; and editing said document image based on said stored image data.

16. The method as recited in claim 15, wherein said plurality of modes include a first mode for editing a region marked by a marker, and said storing step includes a step of storing data for displaying said document image based on said obtained image data, when said first mode is set, and a step of storing data for identifying the region marked by said marker.

17. The method as recited in claim 15, wherein said plurality of modes include a second mode for editing a closed region provided in said document image, and said storing step includes a step of storing data for displaying said document image based on said obtained image data, when said second mode is set, and a step of storing data to identify said closed region.

18. The method as recited in claim 15, wherein said document image is a colored document image, said obtaining step obtains color image data, said plurality of modes include a third mode for editing a color image, and said storing step includes a step of storing said obtained color image by reducing the number of colors of said obtained color image data to a number which can be displayed on the display, when said third mode is set.

19. An image forming apparatus comprising:

means for reading a document and obtaining multi-leveled image data;

binarizing means for binarizing the multi-leveled image data;

means for detecting a closed region based on the binarized image data;

means for editing the closed region and obtaining an edited result; and a display for displaying the edited result based on the multi-leveled image data.

20. An image forming apparatus comprising:

means for reading a document and obtaining multi-leveled image data;

binarizing means for binarizing the multi-leveled image data;

emphasizing means for emphasizing an image portion based on the binarized image data;

means for detecting a closed region based on the binarized image data emphasized by the emphasizing means;

means for editing the closed region and obtaining an edited result; and a display for displaying the edited result based on the multi-leveled image data.

* * * * *